(12) United States Patent
Leonard

(10) Patent No.: US 9,982,430 B2
(45) Date of Patent: May 29, 2018

(54) LAYERED INSULATION SYSTEM

(71) Applicant: Michael R. Leonard, Hagerstown, MD (US)

(72) Inventor: Michael R. Leonard, Hagerstown, MD (US)

( * ) Notice: Subject to any disclaimer, the term of this patent is extended or adjusted under 35 U.S.C. 154(b) by 347 days.

(21) Appl. No.: 14/047,933

(22) Filed: Oct. 7, 2013

(65) Prior Publication Data

US 2014/0141199 A1   May 22, 2014

Related U.S. Application Data

(60) Provisional application No. 61/710,617, filed on Oct. 5, 2012.

(51) Int. Cl.
*B32B 3/24* (2006.01)
*E04B 1/80* (2006.01)
(Continued)

(52) U.S. Cl.
CPC ............... *E04B 1/806* (2013.01); *B32B 3/26* (2013.01); *B32B 3/28* (2013.01); *B32B 5/18* (2013.01); *B32B 5/24* (2013.01); *B32B 7/08* (2013.01); *B32B 7/12* (2013.01); *B32B 9/02* (2013.01); *B32B 23/04* (2013.01); *B32B 27/08* (2013.01); *B32B 27/20* (2013.01); *B32B 27/302* (2013.01); *B32B 29/002* (2013.01); *E04B 1/74* (2013.01); *F24J 2/045* (2013.01); *F24J 2/0444* (2013.01); *F24J 2/51* (2013.01); *B32B 2262/101* (2013.01); *B32B 2264/02* (2013.01); *B32B 2264/101* (2013.01); *B32B 2264/105* (2013.01); *B32B 2264/107* (2013.01); *B32B 2266/0278* (2013.01); *B32B 2307/302* (2013.01);
(Continued)

(58) Field of Classification Search
CPC ..... Y10T 428/24678; Y10T 428/24562; Y10T 428/24661; Y10T 428/2457; B32B 3/266
See application file for complete search history.

(56) References Cited

U.S. PATENT DOCUMENTS 4,525,406 A * 6/1985 Pollock .............. A41D 31/0038
428/137
4,835,034 A * 5/1989 Cruz ....................... E04C 2/205
428/131

(Continued)

FOREIGN PATENT DOCUMENTS

DE     3219339 C1    2/1983
RU     2170310 C1    7/2001

(Continued)

*Primary Examiner* — William P Watkins, III
(74) *Attorney, Agent, or Firm* — West & Associates, A PC; Stuart J. West; Charlotte Rodeen-Dickert

(57) ABSTRACT

A layered insulation system comprising one or more layers. A variety of types of layers can be used in conjunction with one another to deliver a range of desired Low-E and/or Low-U insulation properties and/or venting choices. Some types of layers can be foam layers with foam that inhibits heat conjunction interspersed with microparticles and/or nanoparticles that reflect, scatter, abate, and/or negate infrared radiation (IR) wavelengths, including dampening "Ideal Model Matrix" vibrations to inhibit heat flux through an IR opaque system. Other layers can be Low-E layers, Low-U layers, primarily empty layers, and/or other types of layers.

14 Claims, 23 Drawing Sheets

(51) Int. Cl.

| | | |
|---|---|---|
| *B32B 27/08* | (2006.01) | |
| *E04B 1/74* | (2006.01) | |
| *F24J 2/04* | (2006.01) | |
| *F24J 2/51* | (2006.01) | |
| *B32B 5/18* | (2006.01) | |
| *B32B 5/24* | (2006.01) | |
| *B32B 7/08* | (2006.01) | |
| *B32B 7/12* | (2006.01) | |
| *B32B 9/02* | (2006.01) | |
| *B32B 23/04* | (2006.01) | |
| *B32B 27/20* | (2006.01) | |
| *B32B 27/30* | (2006.01) | |
| *B32B 29/00* | (2006.01) | |
| *B32B 3/26* | (2006.01) | |
| *B32B 3/28* | (2006.01) | |
| *E04B 1/76* | (2006.01) | |

(52) U.S. Cl.
CPC ... *B32B 2307/306* (2013.01); *B32B 2307/412* (2013.01); *B32B 2307/416* (2013.01); *B32B 2307/7265* (2013.01); *B32B 2419/00* (2013.01); *E04B 1/80* (2013.01); *E04B 1/803* (2013.01); *E04B 2001/742* (2013.01); *E04B 2001/748* (2013.01); *E04B 2001/7691* (2013.01); *Y02B 10/20* (2013.01); *Y02E 10/44* (2013.01); *Y10T 428/2457* (2015.01); *Y10T 428/24331* (2015.01); *Y10T 428/24496* (2015.01); *Y10T 428/24562* (2015.01); *Y10T 428/24661* (2015.01); *Y10T 428/24678* (2015.01); *Y10T 428/249953* (2015.04); *Y10T 428/249986* (2015.04)

(56) References Cited

U.S. PATENT DOCUMENTS

| | | | | |
|---|---|---|---|---|
| 5,000,813 | A | * | 3/1991 | Hill .................. C08J 9/40 |
| | | | | 156/307.5 |
| 5,160,785 | A | * | 11/1992 | Davidson, Jr. ....... A47C 27/146 |
| | | | | 297/DIG. 1 |
| 5,422,446 | A | | 6/1995 | Fries |
| 6,310,112 | B1 | * | 10/2001 | Vo .................. C08J 9/14 |
| | | | | 521/134 |
| 6,679,969 | B1 | | 1/2004 | Fournier et al. |
| 8,011,151 | B2 | * | 9/2011 | Pollack ............ B32B 5/18 |
| | | | | 52/309.12 |
| 8,056,953 | B2 | * | 11/2011 | Kiskiras ........... B64C 1/40 |
| | | | | 296/181.6 |
| 8,343,614 | B2 | | 1/2013 | Orologio |
| 8,603,598 | B2 | | 12/2013 | Hyde et al. |
| 8,703,259 | B2 | | 4/2014 | Bowers et al. |
| 2012/0267067 | A1 | * | 10/2012 | Sullivan ........... F24D 3/141 |
| | | | | 165/56 |
| 2012/0273501 | A1 | | 11/2012 | Orologio |
| 2014/0057073 | A1 | | 2/2014 | Hyde et al. |

FOREIGN PATENT DOCUMENTS

| RU | 2247756 C2 | 3/2005 |
|---|---|---|
| RU | 2265251 C2 | 11/2005 |

\* cited by examiner

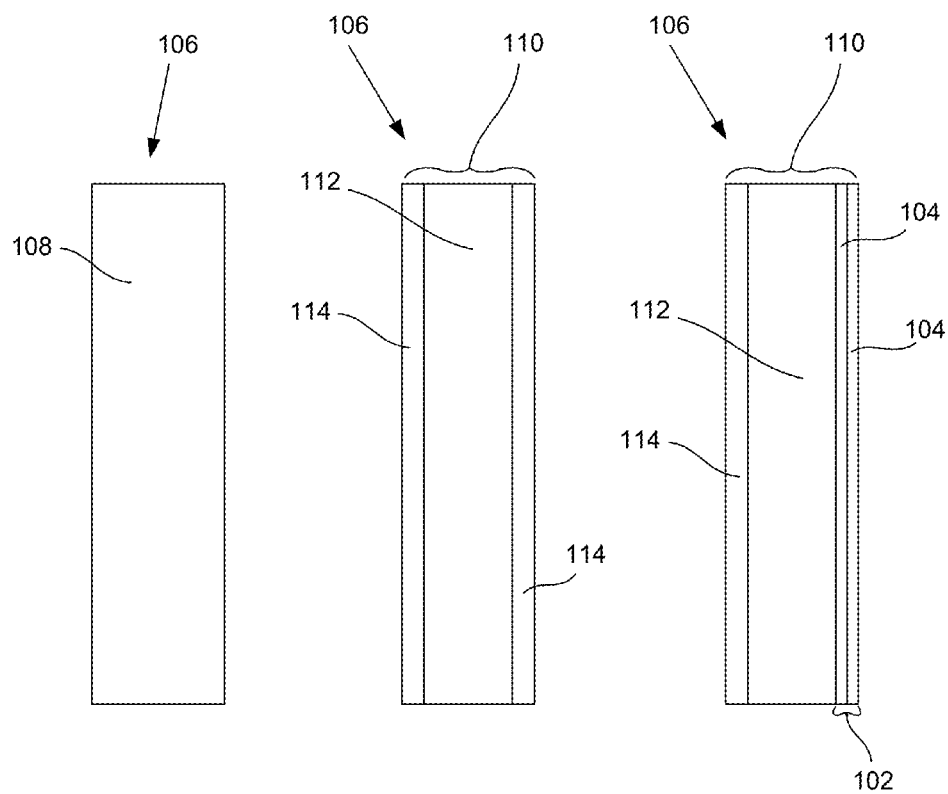

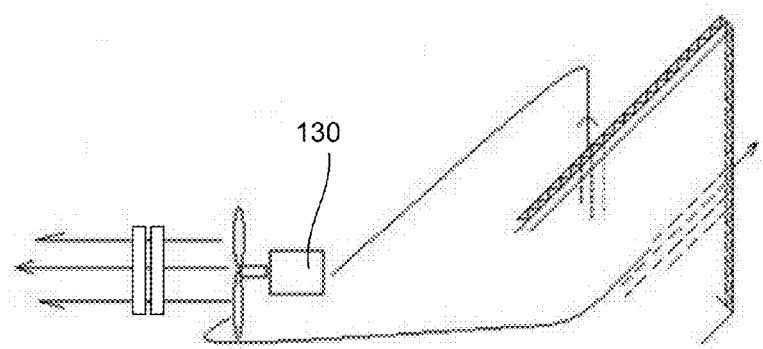
FIG. 13
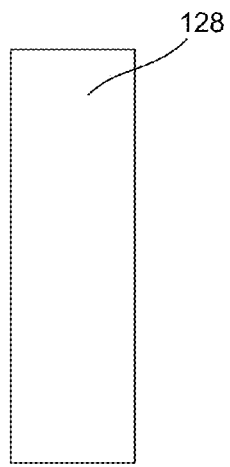 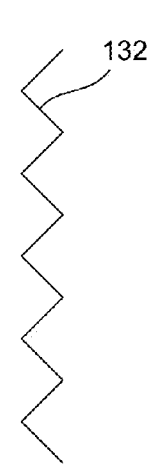 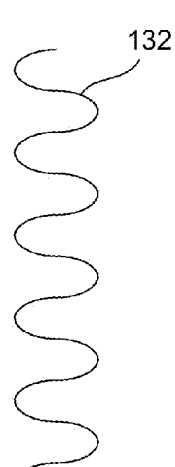 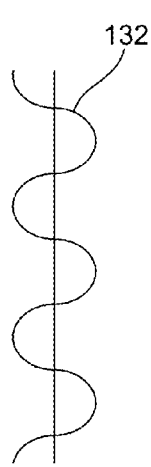 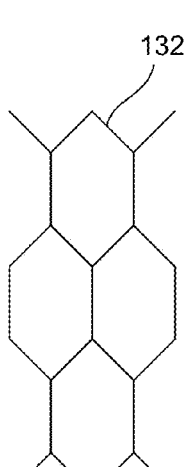
FIG. 14A    FIG. 14B    FIG. 14C    FIG. 14D    FIG. 14E
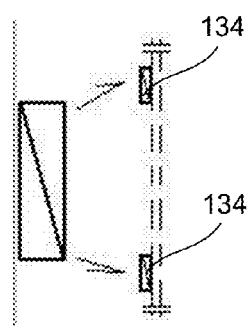 
FIG. 14F    FIG. 14G How shade factor (SF) affects cooling system capacity sizing, number of on/off times per day, as well as the length of run time each time a cooling system turns on.

Normal manufactured house & site built construction manner & means.
Typical 1,750 sf single floor home
Formula show as: A x dT x C x SF x TM
    A = Square Feet Area
    dT = Outdoor surface temperature minus indoor desired space temperature.
    * C = 1/"R" value
    SF = Shade Factor Multiplier
        High Density Shade = .3
        Low Density Shade = .7
        Palm Tree = .97
    TM = Thermal Mass multiplier
        Masonry Construction = .5
        Wood Stud Construction = 1

Effort: Aggressive Energy Efficient Normal Technique/Material Construction
2x6 Stud Wall framing (24" on center) with R-19 batt insulation.
2x12 Stud Rafter Cathedral Roof (24" on center) with R-40 batt insulation A/C Sizing Formula - without radiant barrier
Standard Energy Efficient Construction with partial shade in effect.
50% CA Title 24 Improvement

| | Area | dT ^ | System R ~ 1/"R" * | "C" | SF | TM | Req'd Cooling | |
|---|---|---|---|---|---|---|---|---|
| Roof Shaded Area -25% | 489.3 | 90 | R-40 @85% (R-34) | 0.029 | 0.7 | 1 | 907 | |
| Unshaded Area -75% | 1467.8 | 90 | R-40 @85% (R-34) | 0.029 | 1 | 1 | 3,885 | |
| * Roof Total | 1,957 | 90 | | | | | 4,792 | btus |
| Solar Struck Walls -50% | 710 | 55 | R-19 @85% (R-13.7) | 0.073 | 0.9 | 1 | 2,567 | |
| Shaded Walls -50% | 710 | 25 | R-19 @85% (R-13.7) | 0.073 | 1 | 1 | 1,296 | |
| Total Walls | 1,776.2 | | | | | | 3,863 | btus |

Total wall area adjusted down. Example accounts for 20% total wall area dedicated to windows and doors.

Wall and Roof btu gain in summer =      8,655

Patented System - Full Direct Solar IR imposition!

| | Area | dT ^ | System R ~ 1/"R" | "C" | SF | TM | Req'd Cooling | |
|---|---|---|---|---|---|---|---|---|
| Roof | 1957.0 | 90 | R-38 | 0.0173 | 0.1 | 0.7 | 213 | |
| Solar Struck Walls -50% | 710 | 55 | R-16 | 0.0535 | 0.1 | 0.7 | 146 | |
| Shaded Walls -50% | 710 | 25 | R-16 | 0.0535 | 0.5 | 0.7 | 333 | |
| Total Surface Area | 3,378 square feet | | | | | | 546 | btus |

Wall and Roof btu gain in summer =    546    or    93%    less loss than a 50% improvement for CA Title 24
                                                 or    97%    less loss compared to normal Title 24 requirements \* = Adjusted for roof angle, or pitch. 6:12 used for this example.
~ = System R is the average "R" value throughout the total area, calculated to include all exterior surface areas per formula line.
² = Assumes a nominal 15% adjusted stud frameworks value because of cavity-only batt insulation USDOE suggested R-Value.
^ = A lower surface temperature is not figured here. Rather temperature is compensated for within the SF value to adjust cooling capacity.

FIG. 24

LAYERED INSULATION SYSTEM

This Application claims priority under 35 U.S.C. § 119(e) from earlier filed U.S. Provisional Application Ser. No. 61/710,617, filed Oct. 5, 2013, by Michael Leonard, the entirety of which is incorporated herein by reference.

BACKGROUND

Field of the Invention

The present disclosure relates generally to insulation for inhibiting heat transfer, specifically a layered insulation system.

Background

Traditionally, insulation is placed in the interior or on the exterior of walls, building shells, or other building components. Insulation is often installed during manufacture of new walls, during construction of buildings or other structures, or while retrofitting existing walls. Thermal insulation can serve to inhibit heat transfer through the building components, thereby trapping heat within a structure and/or keeping heat out of a structure. By limiting heat transfer through the use of thermal insulation, the amount of energy needed to heat or cool a building or other structure to a desired temperature can be decreased.

In general, heat can be transferred through various modes, such as radiation, conduction, and/or convection. In many situations, conduction can account for 26% to 35% of the total heat transferred through building shells, while the remaining 65% to 74% can be transferred through infrared radiation. Despite the large percentage of heat transferred through building shells via infrared radiation, most traditional insulation systems only address the smaller portion of heat transferred through building shells via conduction.

What is needed is a layered insulation system that can be applied to the interior and/or exterior of building shells, walls, or other building components that inhibits both conduction and radiation to limit heat transfer through the layered insulation system. The layered insulation system can have layers of varying materials with different heat transfer inhibition properties. The use of a single or plurality of uniquely configured layers with different properties can allow heat transfer to be inhibited non-linearly through the width of the system, and/or address different modes of heat transfer.

It is estimated that currently more than a third of the electricity consumed in the United States is being used to heat and cool buildings, however some embodiments of a layered insulation system can be more efficient than conventional insulation implementations, thereby helping to address modern energy concerns including improving building shell and/or envelope energy efficiency and decreasing energy consumption. Selection of the one or more layers can in some cases be customized for specific applications, which can more adequately address the use requirements and interior and/or exterior environmental concerns of the building or structure.

BRIEF DESCRIPTION OF THE DRAWINGS

FIGS. 3A-3C depict examples of different types of building components that can be used with a layered insulation system.

FIG. 13 depicts an example of a transport system that can pass air, gas, or moisture through a primarily empty layer, channel, or gap.

FIGS. 14A-14G depict exemplary embodiments of primarily empty layers.

FIG. 24 depicts a table of generic load calculations for determinations of mechanical requirements of Btu=(U×delta T×SF area) with and without use of radiant barriers and low U coatings

DETAILED DESCRIPTION

Figure 1A:
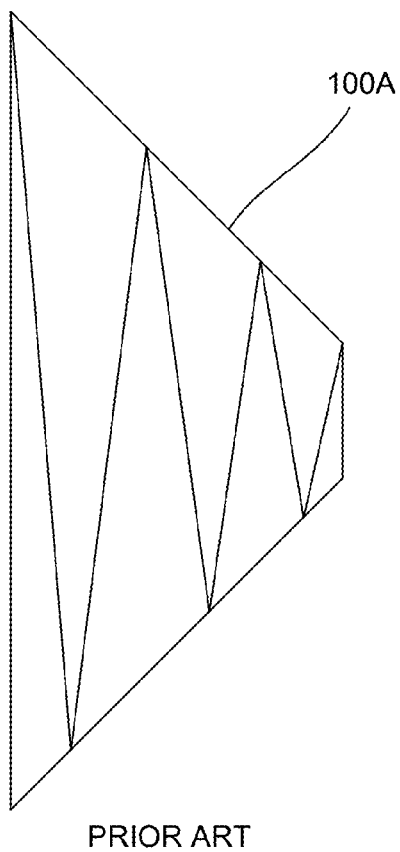
FIG. 1A depicts the heat flow pattern of many prior art insulation systems.
Figure 1B:
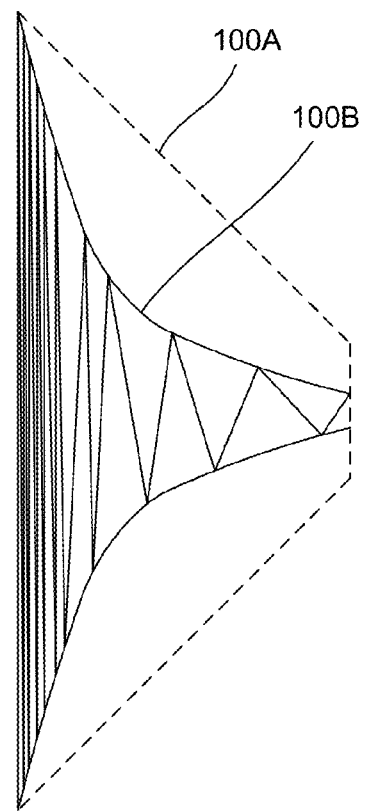
FIG. 1B depicts an embodiment of a heat flow pattern that can be achieved using an embodiment of a layered insulation system.

FIG. 1A depicts a heat flow pattern 100A of many prior art insulation systems. In these prior art systems, heat transfer is resisted linearly as the energy passes through the insulation. The level of thermal resistance of an insulator is often provided as an R-value, a measure of the resistance of heat flow through a given thickness of the insulator, with higher R-values signifying greater resistance to conduction. The R-value is the reciprocal of the material's U-value, the material's overall heat transfer coefficient. In conventional insulation systems, each inch of thickness of the insulation often has the same or similar R-value as other inches of thickness, regardless of how thick the insulation is overall, such that the thermal resistance is roughly the same at any thickness within the insulation. Basic heat flow resistance is often averaged throughout the insulation system. Although the heat flow maintains a stable frequency, its amplitude diminishes as it travels through the insulation system. As can be seen from the heat flow pattern 100A in FIG. 1A, as heat moves from left to right, it is diminished linearly. In contrast, FIG. 1B depicts an exemplary embodiment of a heat flow pattern 100B that can be achieved using an embodiment of a layered insulation system 102.

Figure 2:
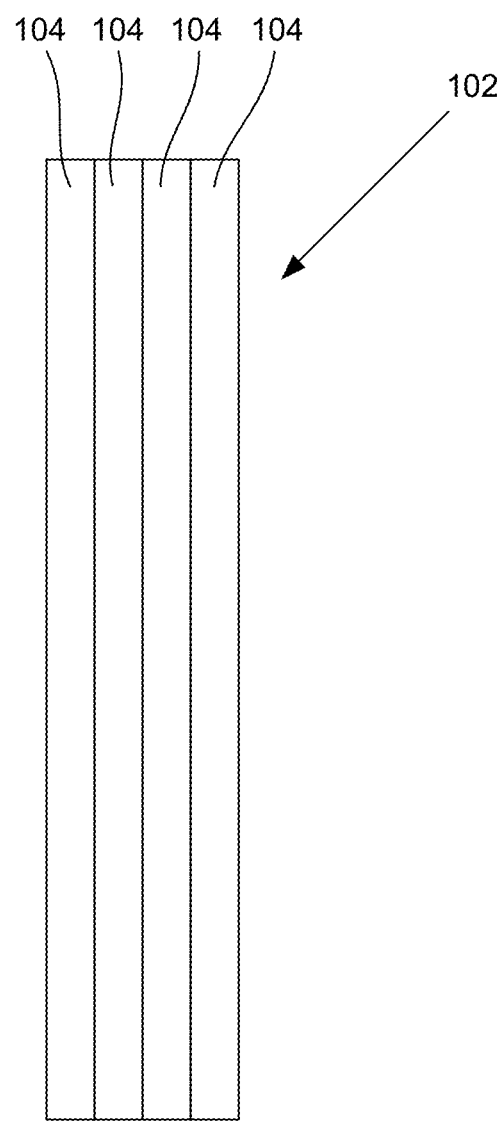
FIG. 2A depicts an exemplary embodiment of a layered insulation system.

FIG. 2 depicts an exemplary embodiment of a layered insulation system 102. A layered insulation system 102 can comprise a plurality of layers 104. Some or all of the layers 104 can have insulating properties that can affect heat transfer through the layered insulation system 102. In various embodiments, each layer 104 can affect, limit, and/or inhibit heat transfer by conduction, convection, and/or radiation. By way of a non-limiting example, one or more layers 104 of the layered insulation system 102 can reflect, re-emit, absorb and/or inhibit infrared radiation, including thermal radiation, or other thermal energy, while one or more other layers 104 can inhibit heat transfer through conduction. In some embodiments, one or more of the layers 104 can have other desired properties, such as protective properties including moisture and/or oil resistance, or finishing attributes.

Returning to FIG. 1B, as the thermal energy passes through the insulation, it can encounter layers 104 with different insulating properties at different thicknesses, which can cause the heat flow frequency and amplitude to diminish differently at each different layer 104, thereby creating the non-linear heat flow pattern 100B. When compared to the linear heat flow pattern 100A, a larger amount of heat can be abated with the non-linear heat flow pattern 100B, such that less thermal energy passes completely through the insulation system.

The layered insulation system 102 can be coupled with, applied to, or used in conjunction with one or more building components 106. The building components 106 can be exterior walls, interior walls, roofs, ceilings, floors, or any other components of a building, building shell, or other structure. FIGS. 3A-3C depict various non-limiting examples of different types of building components 106 that can be used with the layered insulation system 102. In some embodiments, the building component 106 can be a traditionally constructed wall 108, floor, ceiling, or roof, as shown in FIG. 3A. In other embodiments, the building component 106 can be a structural insulated panel (SIP) 110 comprising a core 112 sandwiched between two sheathing components 114, as shown in FIG. 3B. In alternate embodiments, the layered insulation system 102 can be integral with a SIP 110, such that the SIP 110 is fabricated with the layered insulation system 102 in place of one or both sheathing components 114, as shown in FIG. 3C, and/or in place of the core 112.

Figure 4A:
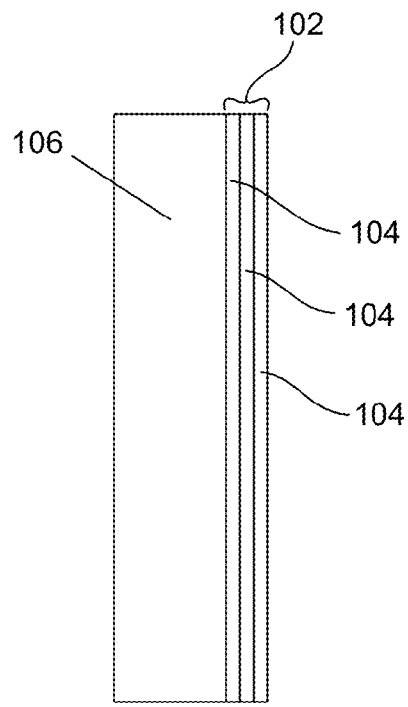
FIGS. 4A-4C depict exemplary embodiments of a layered insulation system in use with a building components.
Figure 4B:
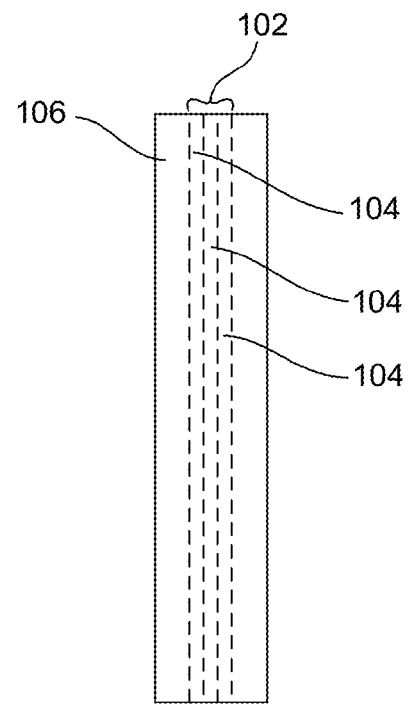
Figure 4C:
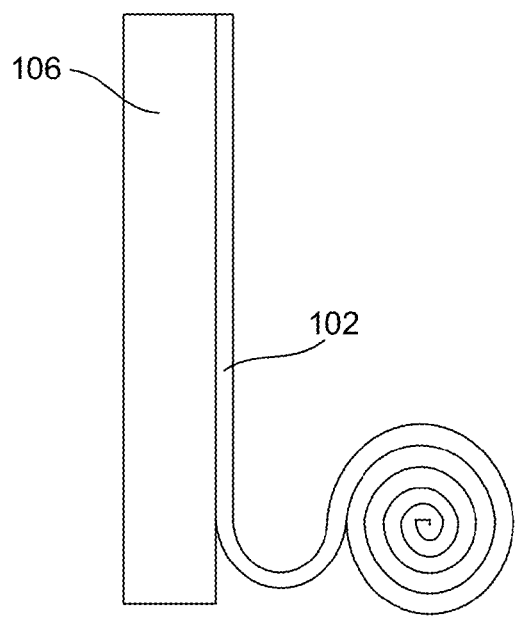

FIGS. 4A-4C depict embodiments of the layered insulation system 102 in use with a building component 106. In various embodiments of the layered insulation system 102, different combinations and types of layers 104 can be used in conjunction with one another to achieve desired insulation and/or protection properties suitable for the building and/or surrounding environment. In some embodiments, the layered insulation system 102 can be used on the exterior of a building or other structure. In other embodiments, the layered insulation system 102 can be used in the interior of a building or other structure. Embodiments of the layered insulation system 102 can be applied to the interior and/or exterior of building components 106. By way of a non-limiting example, FIG. 4A depicts an embodiment of the layered insulation system 102 applied to the exterior surface of a wall. By way of another non-limiting example, FIG. 4B depicts an embodiment of the layered insulation system 102 applied within the interior of a wall in place of conventional insulation.

In some embodiments, the layered insulation system 102 can be provided in rolls as shown in FIG. 4C, such that a desired length can be unrolled and applied to a building component 106. In other embodiments, sheets of the layered insulation system 102 can be pre-formed, as shown in FIG. 2, and can later be applied to a building component 106. In still other embodiments, the layered insulation system 102 can be coupled to the building components 106 one or more layers 104 at a time. In still further embodiments, building components 106 can be manufactured with the layered insulation system 102 integrated into the structure of the building components 106, as shown in FIG. 3C.

In some embodiments, one or more layers 104 of the layered insulation system 102 can be a coating that can be applied to a building component 106 and/or another layer 104. The coating can be applied to the building component 106 and/or other layer 104 by spraying, painting, depositing, dipping, brushing, dabbing, rolling, spreading, wiping, or any other suitable application method.

In some embodiments, one or more layers 104 of the layered insulation system 102 can be a separate component that can be coupled with a building component 106 and/or another layer 104. By way of non-limiting examples, the separate component can be a sheet, slab, film, batting, or any other component. The separate component can be coupled with the building component 106 and/or other layer 104 with adhesives, bonding, nails, screws, bolts, brackets, or any other attachment mechanism, or be held in place between other layers 104. In some embodiments, a separate component can be a film applied to the building component 106 and/or other layer 104.

Layers 104 can have properties to address and/or limit heat transfer through the layer 104 via radiation, conduction, and/or convection. Different embodiments of the layered insulation system 102 can comprise different combinations of layers 104 in order to address the specific heat transfer needs of a building and/or surrounding environment. In some embodiments, all three heat transfer modes can be addressed by the combination of layers 104 in the layered insulation system 102. In other embodiments, one or two heat transfer modes can be addressed by the combination of layers 104 in the layered insulation system 102.

In some embodiments, the combination of layers 104 within an embodiment of the layered insulation system 102 can make the layered insulation system 102 completely opaque to visible and/or ultra-violet light. In some embodiments, the combination of layers 104 can make the layered insulation system 102 be 97% or more opaque to infrared radiation. In other embodiments, the layered insulation system 102 can comprise one or more infrared ablative layers 104 and reflective layers 104, such that the layered insulation system 102 is 100% opaque to infrared radiation.

Figure 5:
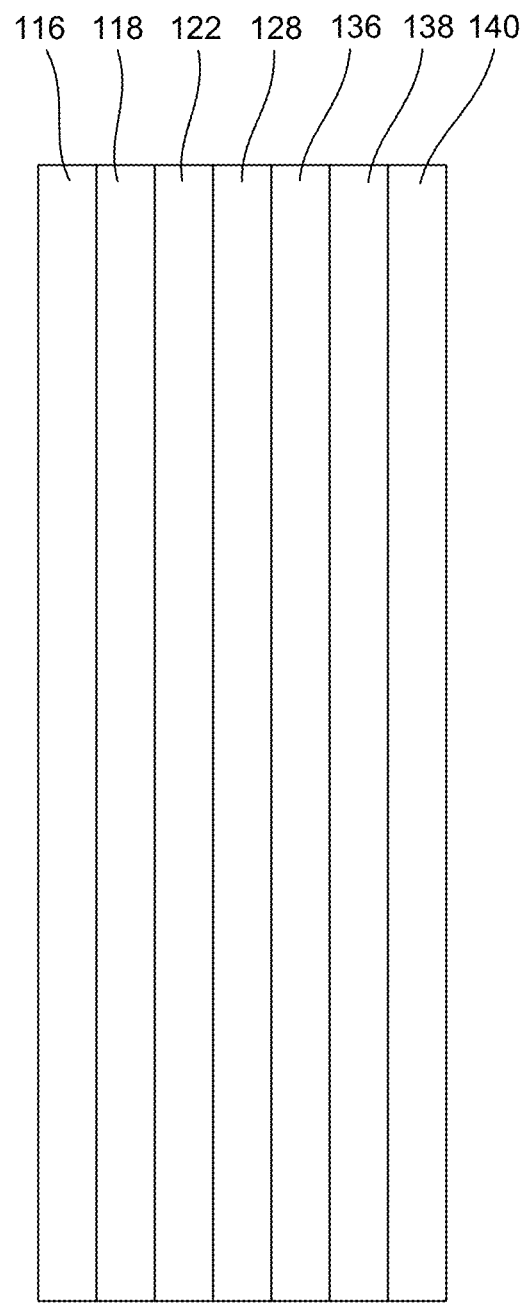
FIG. 5 depicts a plurality of different types of layers that can be used within a layered insulation system.

In some embodiments, the layered insulation system 102 can comprise one or more different types of layers 104. As shown in FIG. 5, types of layers 104 can include low-E layers 116, low-U layers 118, foam layers 122, primarily empty layers 128, protective layers 136, coupling layers 138, and/or finishing layers 140. Different types of layers 104 can be selected and used individually or in combination in various configurations to inhibit thermal transfer in a desired manner suitable for a building, building shell, and/or building envelope in a particular environment.

In some embodiments, one or more of the layers 104 within the layered insulation system 102 can be "low-E" layers 116. Low-E layers 116 can have insulating properties that serve to reflect and/or re-emit radiant energy. In some embodiments, a surface of a low-E layer 116 that reflects and/or re-emits radiant energy can face the direction from which the radiant energy primarily originated or is expected to originate. In some embodiments, a low-E layer 116 can also be low-U, in that it can be resistant to conduction of thermal energy in addition to reflecting and/or re-emitting radiant energy.

By way of a non-limiting example, in some embodiments a low-E layer 116 can be a radiant barrier. A radiant barrier can be a heat mirror that reflects and/or re-emits a percentage of radiant energy, including thermal radiation. The radiant barrier can be a separate component of substrate material such as a sheet, roll, foil, film, or any other type of substrate material. In some embodiments, the substrate material can be coupled with a foam base. In some embodiments, the radiant barrier can comprise one or more metals, such as aluminum or copper. The radiant barrier can have any desired percentage of reflectivity and emissivity. By way of a non-limiting example, in some embodiments the reflectivity of the radiant barrier can be between 90% and 100%, and its emissivity can be between 0% and 10%. In some embodiments, the radiant barrier can be oriented to reflect radiant energy, including thermal radiation, back towards the building component 106. In other embodiments, the radiant barrier can be oriented to reflect radiant energy, including thermal radiation, away from the building component 106 or in any other desired direction. In some embodiments, a radiant barrier can also have at least some resistance to conduction of heat.

By way of another non-limiting example, in some embodiments a low-E layer 116 can be a low infrared emittance coating or film. The low infrared emittance coating or film can reflect and/or re-emit a percentage of radiant energy, including thermal radiation. The low infrared emittance coating or film can have any desired percentage of reflectivity and emissivity. By way of a non-limiting example, in some embodiment the reflectivity of the low infrared emittance coating or film can be between 75% and 100%, and its emissivity can be between 0% and 25%. In some embodiments, the low infrared emittance coating or film can be oriented to reflect radiant energy, including thermal radiation, back towards the building component 106. In other embodiments, the low infrared emittance coating or film can be oriented to reflect radiant energy, including thermal radiation, away from the building component 106, or in any other desired direction.

By way of a further non-limiting example, in some embodiments a low-E layer 116 can be an infrared ablative coating. The infrared ablative coating can ablate, abate, and/or absorb radiant energy, including thermal radiation. The infrared ablative coating can have any desired percentage of radiant energy abatement. By way of a non-limiting example, in some embodiments the infrared ablative coating can abate between 50% and 100% of radiant energy. In some embodiments, the infrared ablative coating can be placed in direct contact with building components 106 and/or other layers 104 without an adjacent space.

While low-E layers 116 can address heat transfer through radiation, in some embodiments one or more layers 104 within the layered insulation system 102 can be low-U layers 118 that serve to absorb and/or inhibit conduction of thermal energy. In some embodiments, low-U layers 118 can be positioned in direct contact with other layers 104 or building components 106. In some embodiments, low-U layers 118 can be solid. In other embodiments, low-U layers 118 can have perforations that can be aligned with radiant materials on adjacent layers 104. In some perforated embodiments, the perforations can be shaped to exhibit Faraday cage properties.

By way of a non-limiting example, in some embodiments a low-U layer 118 can be a low U value coating. The low U value coating can have a low overall heat transfer coefficient, and thus a high R-value. The low U value coating can allow only a certain percentage of thermal energy to be conducted through the coating. The low U value coating can have any desired level of heat conductivity. By way of a non-limiting example, the U-value of a low U value coating can be less than 0.5. In some embodiments configured for extreme conditions such as outer space or deep sea environments, the U-value of a low U value coating can be less than 0.005. In some embodiments, a low U value coating can be placed in direct contact with building components 106 and/or other layers 104.

By way of another non-limiting example, in some embodiments a low-U layer 118 can be batting or sheets of convection-inhibiting insulating material, such as cellulose, wool, polystyrene, urethane foam, fiber, fiberglass or any other material that inhibits heat convection.

In some embodiments, a plurality of particles 120 can be interspersed within other material in the low-U layer 118. By way of a non-limiting example, a low-U layer can comprise a plurality of particles 120 interspersed within a sheet of foam, such that the particles 120 are distributed throughout a foam structural matrix. Each of the plurality of particles 120 can be microparticles having dimensions between 0.1 and 100 micrometers and/or nanoparticles having dimensions less than 100 nanometers. Each of the plurality of particles 120 can comprise ceramics, glass, chemicals, polymers, and/or metals.

Figure 6A:
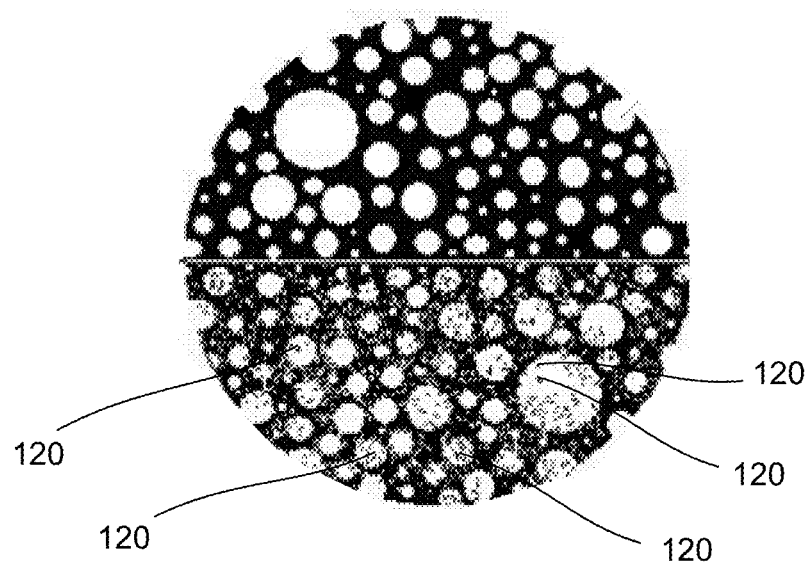
FIG. 6A depicts an embodiment of a foam body and an embodiment of a foam body comprising a plurality of particles.

In some embodiments, one or more particles 120 can be low-U particles that can inhibit convection. By way of a non-limiting example, in some embodiments a low-U layer 118 can be a foam such as the microsphere or nanoparticle filled casing shown in FIG. 6A. The upper half of FIG. 6A depicts standard foam insulation. Standard foam insulation in a cured or dried state can establish heat flow pathways formed by air or gas bubbles trapped with the foam. By contrast, the bottom half of FIG. 6A depicts low-U foam, which comprises low-U particles 120 mingled within the air or gas bubbles of the foam. The low-U particles 120 can reduce conductance about the exterior of the bubbles by increasing the distance of heat flow pathways around the bubbles, thereby increasing heat resistance. Additionally, in some embodiments the cured chemical separating each bubble can be intermixed with low-U particles 120, thereby enhancing heat flow resistance and increasing the distance of the heat flow pathways.

Figure 6B:
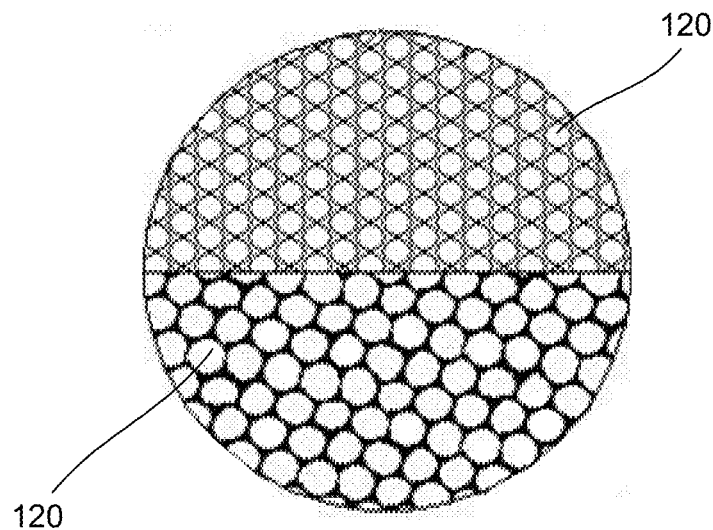
FIG. 6B depicts exemplary embodiments of particle arrangements.

FIG. 6B depicts exemplary embodiments of low-U particles 120. Low-U particles 120 can be spherical, conical, crystalloid, cylindrical, tubular, or any other shape. In some embodiments, low-U particles 120 can be organized to minimize surface contact with adjacent low-U particles 120, thereby creating ultra-low conduction properties, as shown in the upper half of FIG. 6B. In alternate embodiments, low-U particles 120 can be disorganized, such that they are not organized any particular manner, as shown in FIG. 6B.

In some embodiments, one or more layers 104 of the layered insulation system 102 can inhibit heat transfer through both radiation and conduction. By way of a non-limiting example, a layer 104 can comprise one or more particles 120 that inhibit radiation while the material surrounding the particles 120 inhibits convection. Some or all of the particles 120 can be microparticles or nanoparticles sized to absorb, re-emit, abate, negate, scatter, and/or reflect infrared radiation. By way of a non-limiting example, the particles 120 can have dimensions between 700 nanometers and 1 millimeter, approximately on the scale of the wavelengths of infrared radiation. In some embodiments, the particles 120 can also be fire resistant, such as ceramic particles.

Figure 7A:
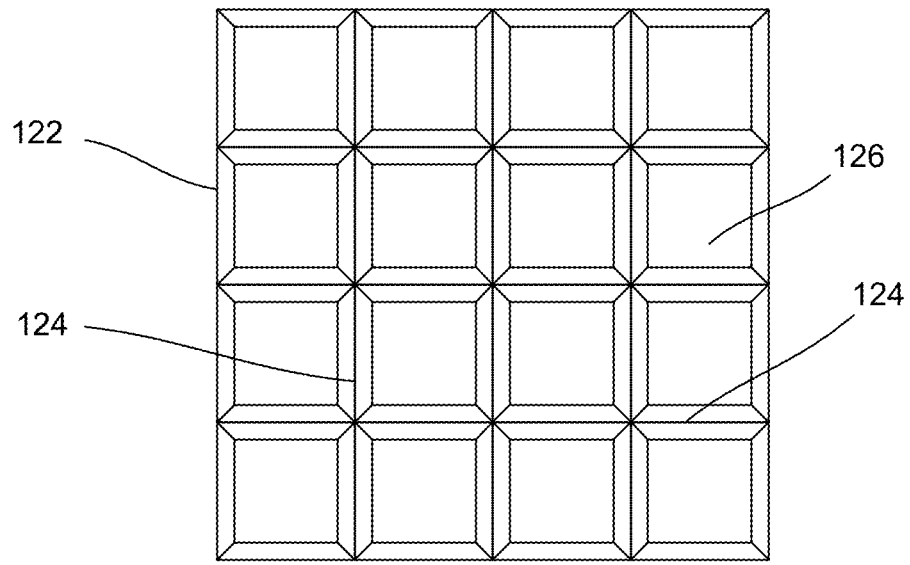
FIGS. 7A-7C respectively depict views of a first surface, a cross section, and a second surface of a first embodiment of a foam layer.
Figure 7B:
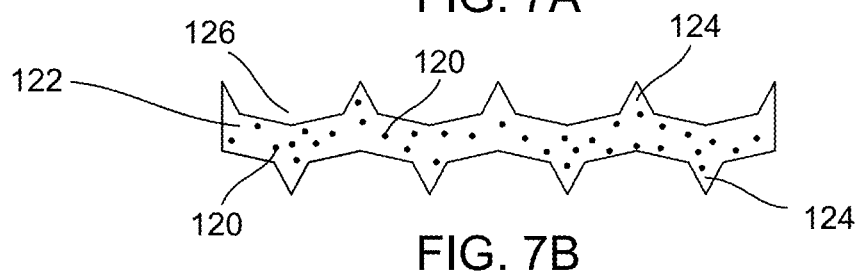
Figure 7C:
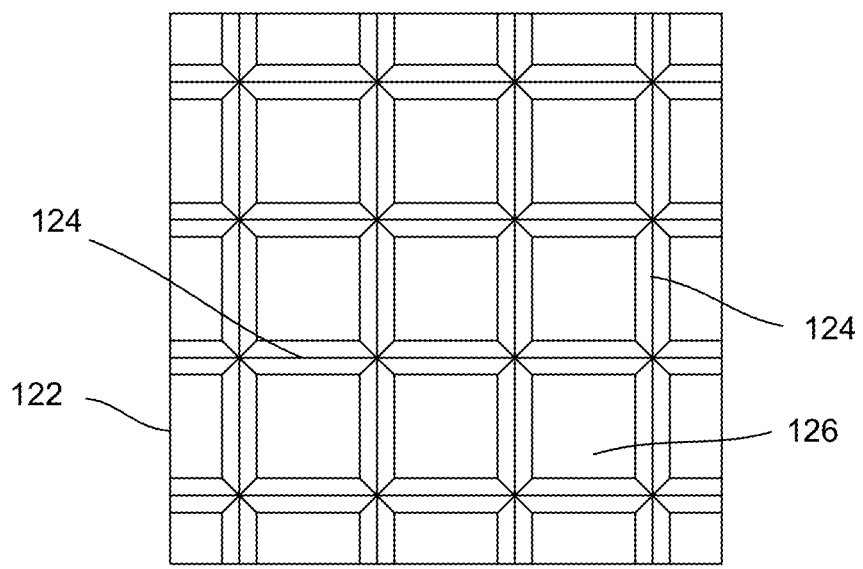

FIGS. 7A-7C depict an exemplary embodiment of a foam layer 122 comprising foam interspersed with infrared radiation absorbing, re-emitting, and/or reflecting particles 120, such that the foam can inhibit heat conduction and the plurality of particles 120 can also absorb, re-emit, abate, negate, scatter and/or reflect infrared radiation. In some embodiments, the plurality of particles 120 can also increase resistance to heat conduction by increasing the distance of heat flow patterns within the foam in addition to absorbing, re-emitting, and/or reflecting infrared radiation. In some embodiments, the foam within a foam layer 122 can be doped foam, while in other embodiments the foam can be without doping.

In some embodiments the foam layer 122 can have one or more protrusions 124, such as ridges, bumps, spacers, or any other protrusions extending from the body of the foam layer 122. In some embodiments, the surface of the foam layer 122 can be at least partially covered with a coating layer 104 or a separate component layer 104. By way of a non-limiting example, in some embodiments a surface of the foam layer 122 can be covered with a radiant barrier that follows the contours of the body of the foam layer 122 and its protrusions 124. In other embodiments, adjacent layers can be substantially flat, such that the adjacent layers 104 contact the protrusions 124 and leave a gap 126 between the protrusions 124, the body of the foam layer 122, and the adjacent layer 104.

Figure 8A:
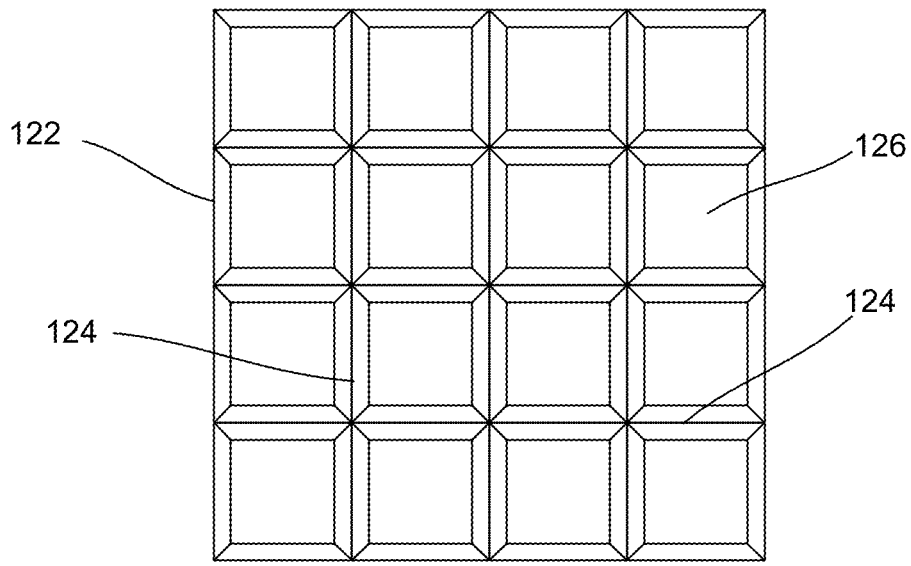
FIGS. 8A-8C respectively depict views of a first surface, a cross section, and a second surface of a second embodiment of a foam layer.
Figure 8B:
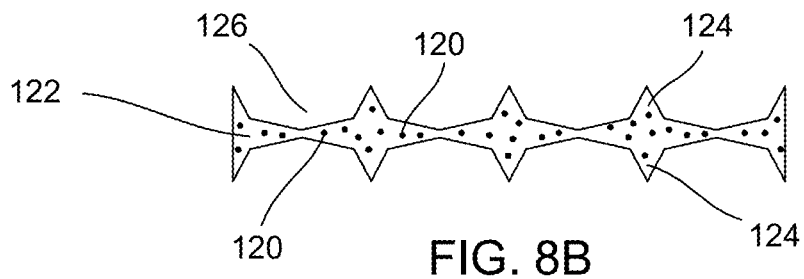
Figure 8C:
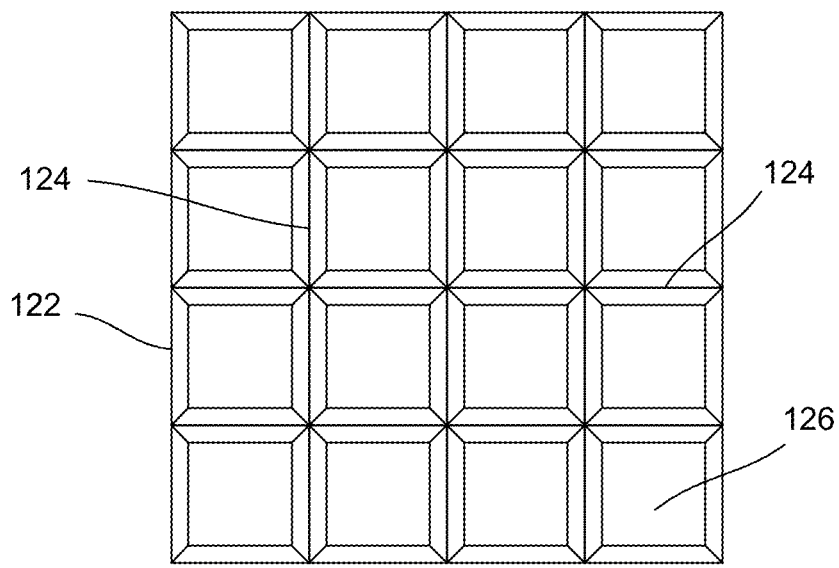

In some embodiments, the protrusions 124 of a foam layer 122 can be ridges arranged in a substantially waffle-like pattern. In some embodiments, the waffle-like pattern can be offset on opposing surfaces of the foam layer 122. By way of a non-limiting example, FIGS. 7A-7C respectively depict a first surface of a waffle-patterned foam layer 122, a cross section of the waffle-patterned foam layer 122, and a second surface of the waffle-patterned foam layer 122. As can be seen from FIGS. 7A-7C, the ridges of the waffle-like pattern on the first surface can be offset from the ridges on the opposing second surface. In alternate embodiments, the waffle-like pattern can be aligned on opposing surfaces of the foam layer 122. By way of a non-limiting example, FIGS. 8A-8C respectively depict a first surface of a waffle-patterned foam layer 122, a cross section of the waffle-patterned foam layer 122, and a second surface of the waffle-patterned foam layer 122. As can be seen from FIGS. 8A-8C, the ridges of the waffle-like pattern on the first surface can be aligned with the ridges on the opposing second surface.

Figure 9A:
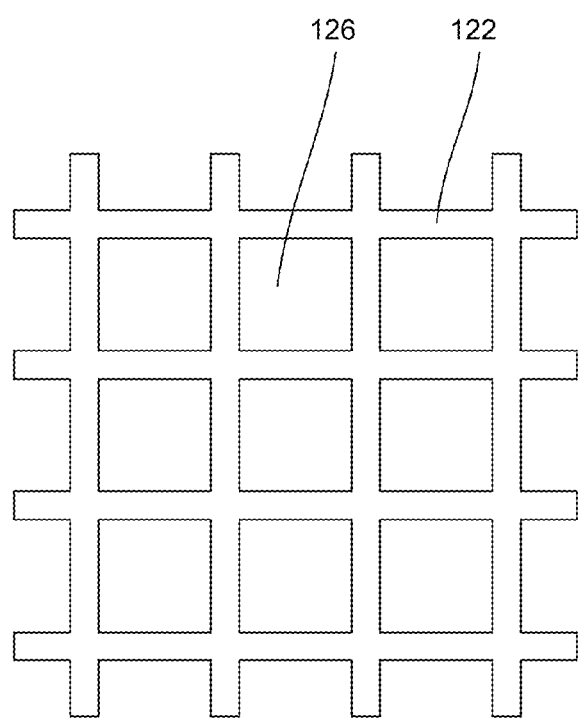
FIGS. 9A-9B respectively depict a front view and cross section view of a third embodiment of a foam layer in a lattice shape.
Figure 9B:
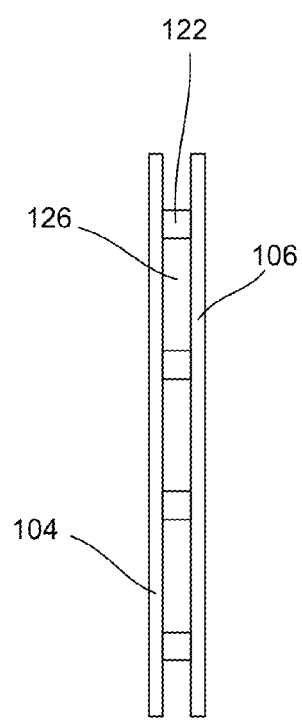

In alternate embodiments, the foam layer 122 can be substantially flat and its gaps 126 can be apertures defined by the body of the foam layer, as shown in the front view of FIG. 9A and the cross section view of FIG. 9B. In some embodiments, the foam layer 122 can have a grid or lattice structure, as shown in FIG. 9A. As can be seen from FIG. 9B, in these embodiments the foam layer 122 can contact adjacent layers 104 and/or building components 106 directly, without protrusions 124. In still other embodiments, the foam layer can be substantially flat without gaps 126.

Figure 10A:
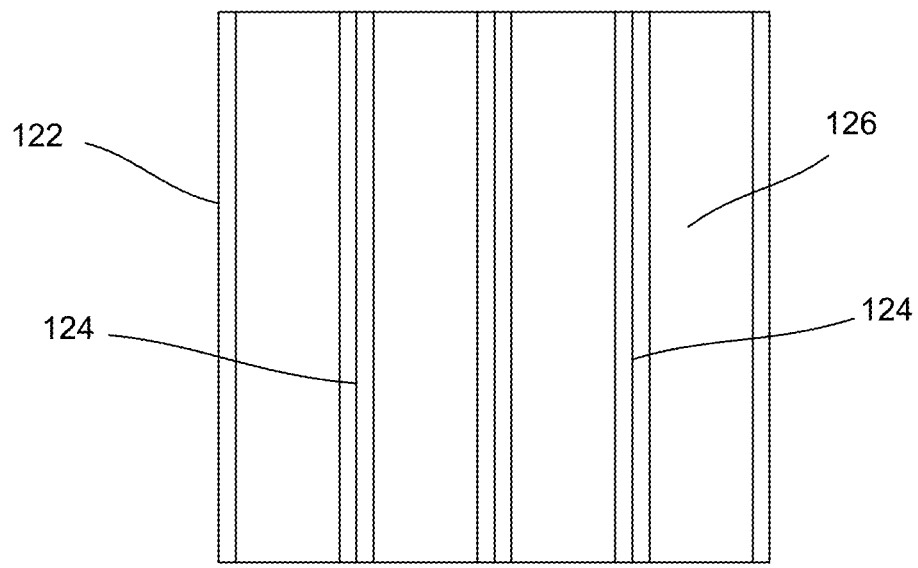
FIG. 10A-10C respectively depict views of a first surface, a cross section, and a second surface of a fourth embodiment of a foam layer.
Figure 10B:
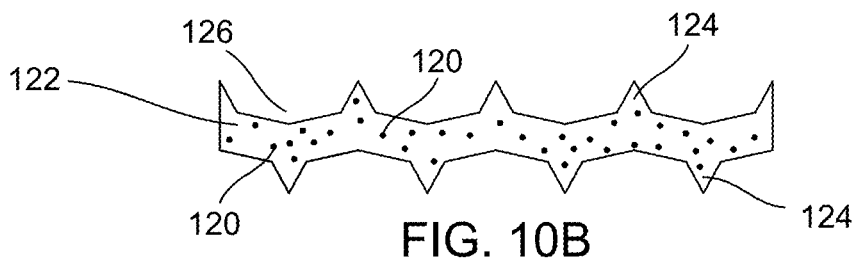
Figure 10C:
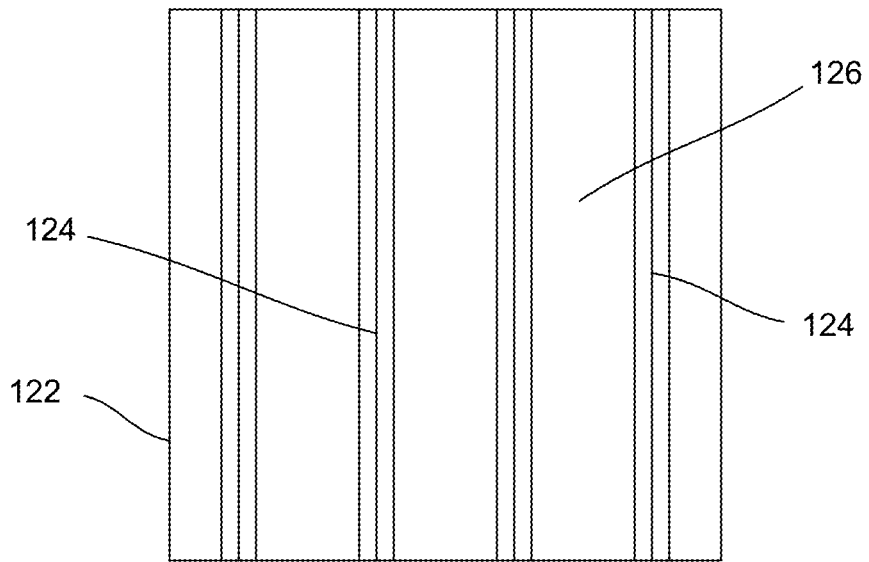
Figure 11:
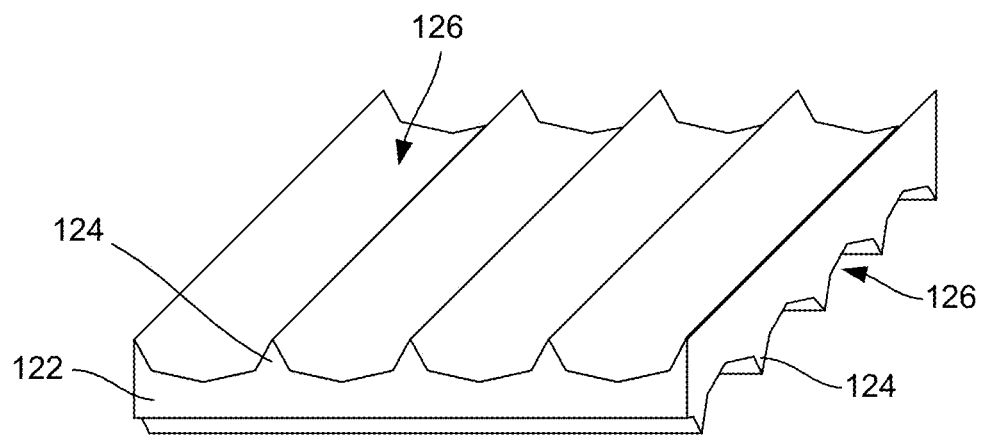
FIG. 11 depicts an angled view of a foam layer with channels aligned orthogonally on opposing sides of the foam layer.

In some embodiments, the foam layer 122 can have protrusions 124 that are arranged in lines, waves, cross-hatching, or in any other desired geometric or non-geometric pattern. By way of a non-limiting example, FIGS. 10A-10C respectively depict a first surface, a cross section, and a second surface of a foam layer 122 with protrusions 124 arranged as parallel lines. In some embodiments, the arrangement and/or orientation of the protrusions 124 can be different on opposing sides of the foam layer 122. By way of a non-limiting example, FIG. 11 depicts an angled view of an embodiment of the foam layer 122 having ridges and gaps 126 aligned in orthogonal directions on opposing sides of the foam layer 122.

Figure 12:
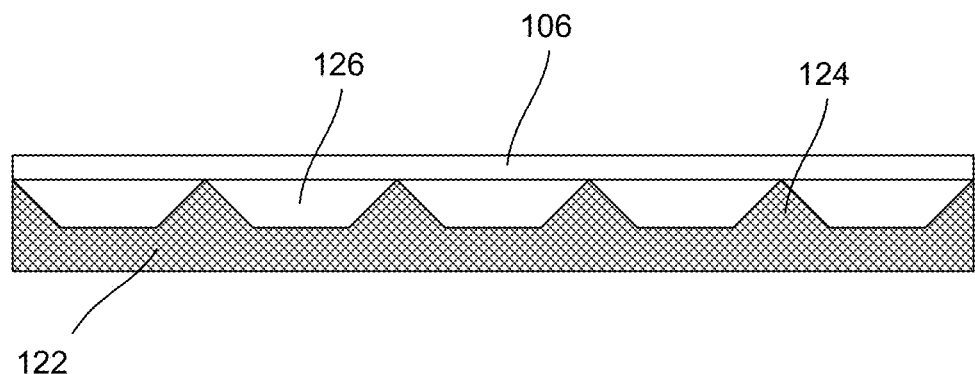
FIG. 12 depicts a foam layer coupled with a building component.

In some embodiments, such as the embodiments shown in FIGS. 10A-10C and FIG. 11, the protrusions 124 can be ridges arranged so that the gaps 126 are channels bordered by the ridges, such that streams of gas or liquid can pass through the channels. In some embodiments, the channels formed by the protrusions 124 can be used for vacuum, venting, heat recovery, and/or heating or cooling of adjacent layers 104 and/or adjacent building components. By way of a non-limiting example, FIG. 12 depicts a side view of an embodiment of a foam layer 122 underneath a building component 106 such as a roof deck or floor. The parallel ridges of the foam layer 122 can contact the roof deck or floor, forming channels at the gap 126 between the ridges, the foam layer 122, and the roof deck or floor. In some situations, hot air can be forced through the channels to heat an adjoining roof deck, which can cause snow resting on the roof deck to melt. In other situations, warm air resting within the gaps 126 can be vacuumed from the channels to recover the thermal energy for use elsewhere in the building, and/or to cool the adjacent layers 104. By way of a non-limiting example, heated or cooled air can be passed through the channels to deliver thermal potential to heating sources, heat pumps, hot air solar collector systems, ground source cooled air systems, or other systems. Similarly, moisture within the gaps 126 can be transported through the channels to remove moisture from the layered insulation system 102, thereby decreasing the chances for condensation damage of the layers 104. In some embodiments, mechanical gates within one or more channels can be automatically or electronically activated to control airflow through the channels. In other embodiments, venting can be natural airflow through the channels.

In some embodiments, one or more layers 104 of the layered insulation system 102 can be primarily empty layers 128. In some embodiments, a primarily empty layer 128 can be a complete layer coupled with some or all of an adjacent layer 104 and/or a building component 106. In other embodiments, a primarily empty layer 128 can fill all or a portion of a gap 126 of a foam layer 122 or apertures or empty spaces in any other layer 104. The majority of the space within a primarily empty layer 128 can be filled with air, gas, or a vacuum. In some embodiments, a primarily empty layer 128 can have one or more channels that can be used for vacuum, venting, and/or heat recovery, similar to the gaps 126 in some embodiments of a foam layer 122. In some embodiments, air flow for cooling and/or heating from a transport system 130 can pass through a primarily empty layer 128, as shown in FIG. 13. In some embodiments, the transport system 130 can be a fan. In alternate embodiments, the transport system 130 can be a heater, air conditioner, vacuum, or any other source. In some embodiments, the transport system 130 can be solar powered. As with the gaps 126 of a foam layer, cool air and/or heated air within a primarily empty layer 128 can be transported via the transport system 130 to a heat pump or other systems, and moisture can be transported away from the layers 104.

In some embodiments, a primarily empty layer 128 can be an empty chamber, as shown in FIG. 14A. In other embodiments, a primarily empty layer 128 can have at least some structural material 132 for support. In some embodiments, the supporting structural material 132 within a primarily empty layer 128 can also have at least some low-E, low-U, insulating, protective, or any other desired properties. By way of a non-limiting example, a primarily empty layer 128 can be a baffled chamber. In some embodiments, the baffled chamber can comprise structural material 132 that provides at least some structural support to the primarily empty layer 128 and/or other layers 104 but does not fill the entire chamber and/or layer 104. In some embodiments, the structural material 132 for a baffled chamber can be a corrugated material, such as foam, paper, fabric, and/or any other type of material, as shown in FIGS. 14B and 14C. In alternate embodiments, the structural material 132 can be bubble pack material, as shown in FIGS. 14D and 14E. In some embodiments, the structural material 132 can have any of the low-E, low-U, protective, coupling, adhesive and/or other qualities described elsewhere in this specification.

By way of another non-limiting example, a primarily empty layer 128 can comprise aerogel. Aerogel can be a strong, durable, thin, and/or flexible material that comprises an air content of 90-99% or higher. In some embodiments, aerogel can have a very low thermal conductivity, causing the aerogel to be an insulator that can be two to eight times more effective than traditional insulation materials such as polystyrene, mineral wool, and cellulose. In other embodiments, aerogel can at least partially fill one or more gaps 126 of a foam layer 122, such as filling the gaps 126 of the substantially waffle-like patterned foam layer 122 shown in FIGS. 7A-7C.

By way of yet another non-limiting example, a primarily empty layer 128 can comprise spacers 134, as shown in FIGS. 14F and 14G. In some embodiments, spacers 134 can be fir strips. In other embodiments, spacers 134 can be pieces of wood, plastic, metal, or any other material that provide structural support and/or create air or gas channels.

Figure 15:
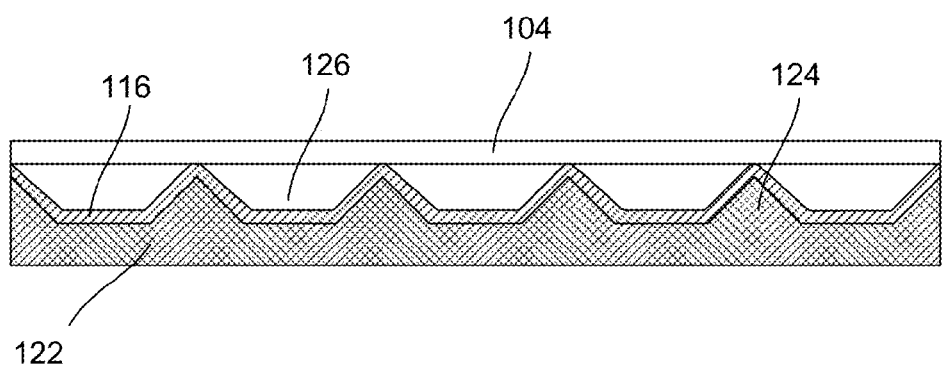
FIG. 15 depicts a cross section of an exemplary embodiment of a foam layer with the gaps between the foam layer and adjacent layer and/or building component lined with a radiant barrier.

In some embodiments, a primarily empty layer 128 or gap 126 can be lined with a radiant barrier or other low-E layer 116, such that infrared radiation entering the primarily empty layer 128 or gap 126 is reflected by the lining. By way of a non-limiting example, FIG. 15 depicts an embodiment of a foam layer 122 lined with a radiant barrier that follows the contours of the foam layer 122 and protrusions 124. In other embodiments, the primarily empty layer 128 or gap 126 can be lined with a low-U layer, or be lined with both a low-E layer 116 and a low-U layer 118. In some embodiments, a gap 126 or primarily empty layer 128 can be sealed to keep air or gas sealed within the primarily empty layer 128 or gap 126. By way of a non-limiting example, in some embodiments a primarily empty layer 128 or gap 126 can be hermetically sealed with an infrared transparent membrane. Additionally, air or gas sealed within a primarily empty layer 128 or sealed within a gap 126 between a foam layer 122 and an adjacent layer 104 or building component 106 can have a degree of resistance to heat conduction.

In some embodiments, one or more layers 104 within the layered insulation system 102 can have other non-insulating properties, such as a protective layer 136, a coupling layer 138, and/or a finishing layer 140.

In some embodiments, a protective layer 136 can be a vapor coating. Vapor coating can be a water, oil and/or moisture resistant coating that can provide protection to the building component 106 and/or other layers 104. Vapor coating can have any desired level of protection. By way of a non-limiting example, in some embodiments a vapor coating can have 15 minute Cobb values less than 10 gsm, a 3M oil resistance of 11, and a moisture vapor transmission rate (MVTR) values less than or equal to 4 g/102 in. sq./24 hr. at 38 deg. C./90% R.H. In other embodiments, protective layers can be fire resistant, sun-resistant, and/or have any other protective qualities.

In some embodiments, a coupling layer 138 can comprise one or more adhesives. In other embodiments, coupling layers 138 can comprise bindings. In still other embodiments, coupling layers 138 can be material to which other layers 104 are nailed, screwed, bolted, bonded, adhered, or otherwise coupled.

In some embodiments, a finishing layer 140 can be a coating such as paint or primer. In other embodiments, a finishing layer 140 can be a material, such as metal, wood, oriented strand board, cement, sheetrock, or any other known or desired material. In some embodiments, the finishing layer 140 can be made of the same material as the sheathing 114 of a SIP 110. In some embodiments, the finishing layer 140 can be suitable for use in the interior and/or on the exterior of a building.

Figure 16A:
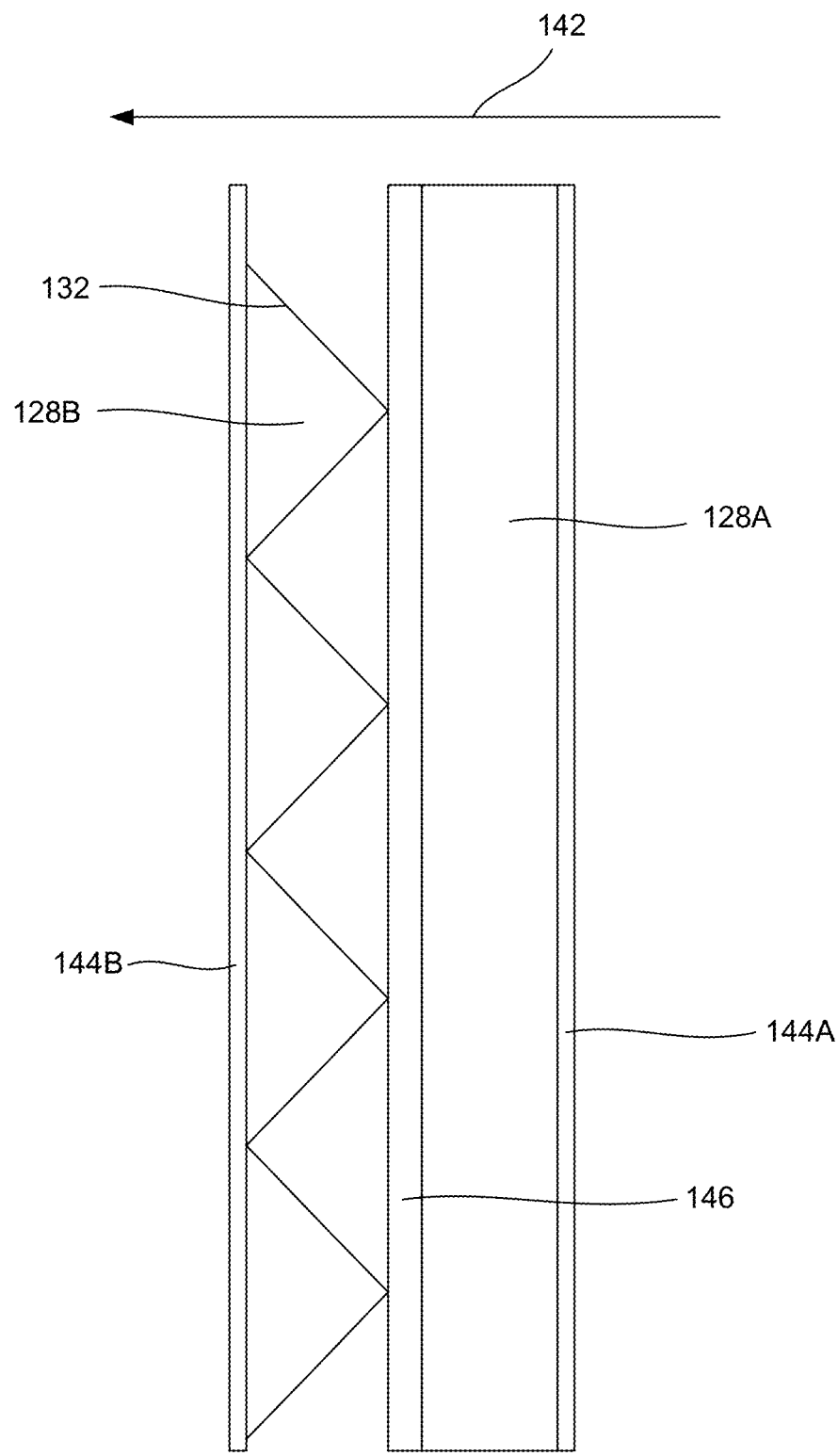
FIG. 16A-16D respectively depict a side view of a first exemplary embodiment of a layered insulation system and close ups of individual layers.

FIG. 16A depicts a first exemplary embodiment of the layered insulation system 102. In this first exemplary embodiment, the layered insulation system 102 can at least partially inhibit thermal energy transfer in the direction indicated by arrow 142. In this embodiment, the layered insulation system 102 can comprise a first combination layer 144A, a first primarily empty layer 128A, a core section 146, a second primarily empty layer 128B, and a second combination layer 144B.

Figure 16B:
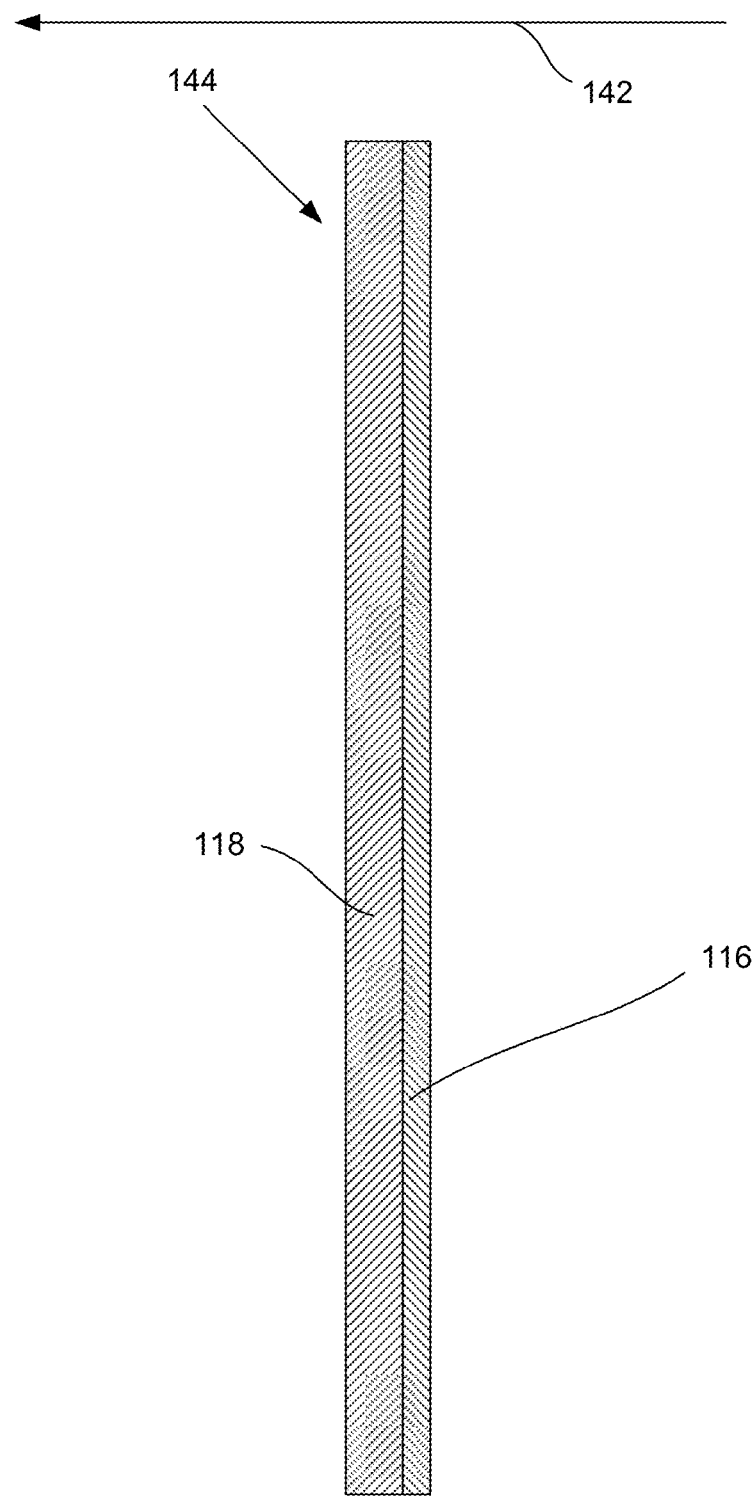

FIG. 16B depicts an embodiment of the combination layers 144A and 144B shown in FIG. 16A. In this exemplary embodiment, the combination layers 144A and 144B can comprise a low-E layer 116 and a low-U layer 118. In some embodiments, the low-E layer 116 can be a radiant barrier with over 97% reflectivity. In some embodiments, the low-U layer 118 can have a U value between 0.05 and 0.00005. The low-E layer 116 can serve to reflect a portion of the radiant energy traveling in the direction shown by arrow 142. Radiant energy that passes through the low-E layer 116 can be at least partially absorbed by the low U layer 118, such that only a percentage of the thermal energy entering the low U layer 118 is entirely conducted through the low U layer 118. In some embodiments, one or more additional layers 104 can be coupled between the low-E layer 116 and the low-U layer 118, such as vapor coatings, infrared ablative layers, additional low-U layers 118, coupling layers, binding layers, primers, or any other layer 104 described herein. Referring back to FIG. 16A, the thermal energy that is transferred entirely through the combination layer 144A can pass into the first intermediate section 128A.

In the embodiment shown in FIG. 16A, the first intermediate section 128A can be an empty chamber, as shown in FIG. 14A. In alternate embodiments, the empty chamber 128 can have one or more channels, and air can flow through the empty chamber 128 to or from a transport system 130. The thermal energy that is transferred entirely through the first intermediate section 128A can pass into the core section 146.

Figure 16C:
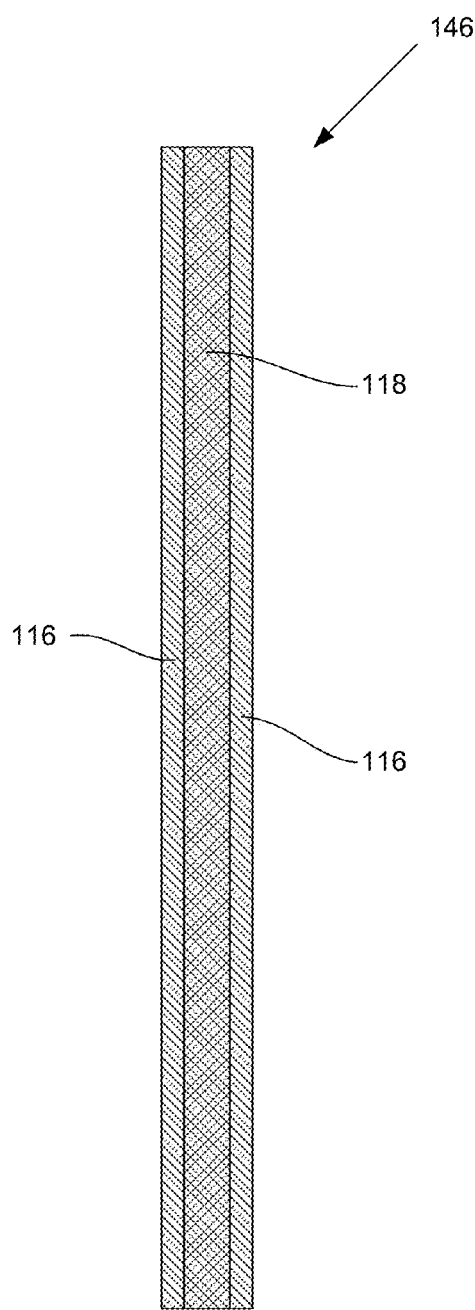
Figure 16D:
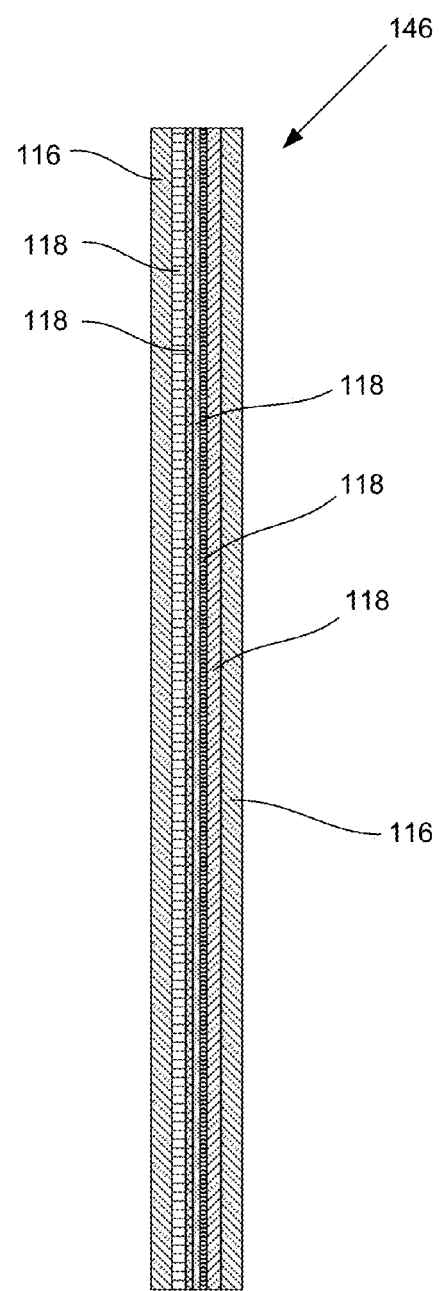

FIGS. 16C and 16D depict exemplary embodiments of the core section 146 shown in FIG. 16A. The core section 146 can comprise one or more central layers 104 sandwiched between two exterior layers 104. The central layers 104 can be encased within the exterior layers 104 via thermo-set, heat, thread stitch, chemical adhesive, plastic rivet, or any other suitable fastener. In the embodiment shown in FIG. 16C, the exterior layers 104 of the core section 146 can be low-E layers 116, and the central layers can be a single low-U layer 118. In the embodiment shown in FIG. 16D, the exterior layers 104 can be low-E layers 116, and the central layers can be a plurality of low-U layers 118. The low-E layers 116 can serve to reflect radiant energy away from the core section 146 back toward the first intermediate section 128A and second intermediate section 128B. Referring back to FIG. 16A, the thermal energy that passes through the core section 146 in the direction of arrow 142 can pass into the second intermediate section 128B.

In the embodiment shown in FIG. 16A, the second intermediate section 128B can be a primarily empty layer 128 comprising structural material 132, as shown in FIGS. 14B-14G. In some embodiments, the baffled chamber can have one or more channels, and air can flow through the baffled chamber to or from a transport system 130. The thermal energy that is transferred entirely through the second intermediate section 128B in the direction of arrow 142 can pass to the second combination layer 144B.

In the embodiment shown in FIG. 16A, the second combination layer 144B can be substantially similar to the first combination layer 144A, in that it can comprise a low-E layer 116 and a low-U layer 118, as shown in FIG. 16B. The thermal energy that is transferred entirely through the combination layer 144B can pass out of the layered insulation system 102, however the thermal energy that passes out of the layered insulation system 102 can be less than the thermal energy that entered the layered insulation system 102 due to the interaction between the thermal energy and the plurality of layers 104 within the layered insulation system 102.

Figure 17:
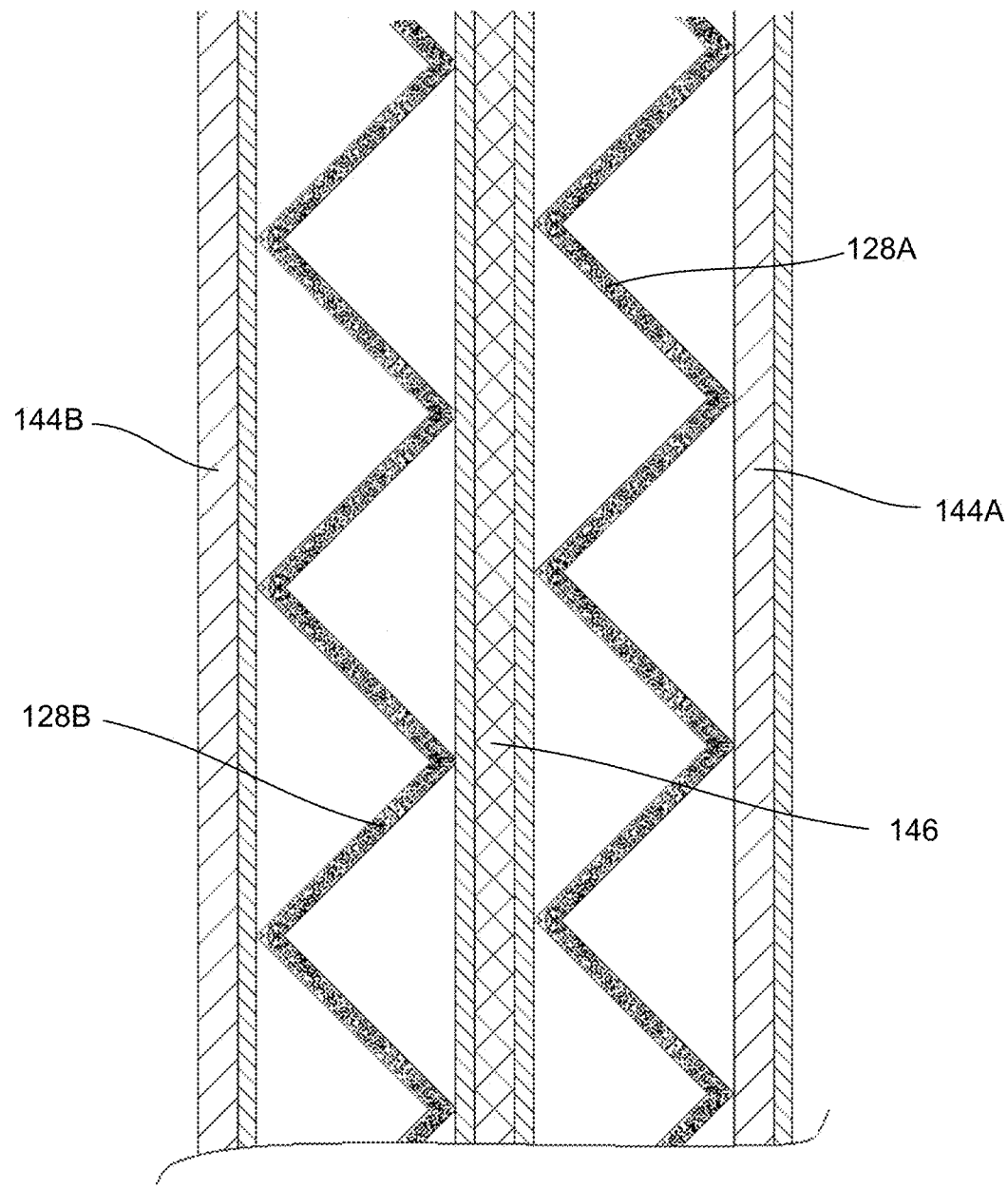
FIG. 17 depicts a second exemplary embodiment of a layered insulation system.

FIG. 17 depicts a second exemplary embodiment of the layered insulation system 102. In this second exemplary embodiment, the layered insulation system 102 can comprise a first combination layer 144A, as shown and described with reference to FIG. 16B, a first primarily empty layer 128A comprising structural material 132, as shown in FIGS. 14B-14G, a core section 146 as shown and described with reference to FIGS. 16C and 16D, a second primarily empty layer 128B comprising structural material 132, as shown in FIGS. 14B-14G, and a second combination layer 144B, as shown and described with reference to FIG. 16B.

Figures 18, 19:
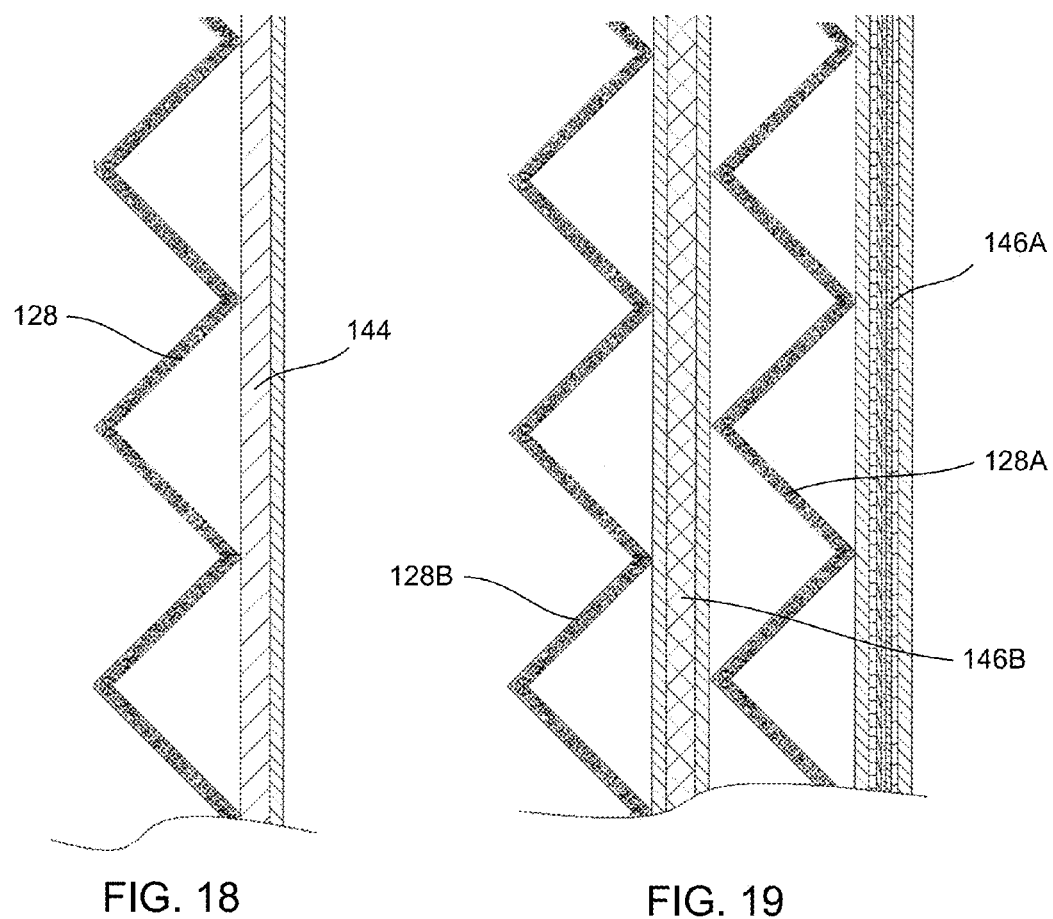
FIG. 18 depicts a third exemplary embodiment of a layered insulation system.
FIG. 19 depicts a fourth exemplary embodiment of a layered insulation system.

FIG. 18 depicts a third exemplary embodiment of the layered insulation system 102. In this third exemplary embodiment, the layered insulation system 102 can comprise a combination layer 144, as shown and described with reference to FIG. 16B, and a primarily empty layer 128 comprising structural material 132, as shown in FIGS. 14B-14G.

FIG. 19 depicts a fourth exemplary embodiment of the layered insulation system 102. In this fourth exemplary embodiment, the layered insulation system 102 can comprise a first core section 146A as shown and described with reference to FIG. 16D, a first primarily empty layer 128A comprising structural material 132, as shown in FIGS. 14B-14G, a second core section 146B, as shown and described with reference to FIG. 16C, and a second primarily empty layer 128B comprising structural material 132, as shown in FIGS. 14B-14G.

Figure 20A:
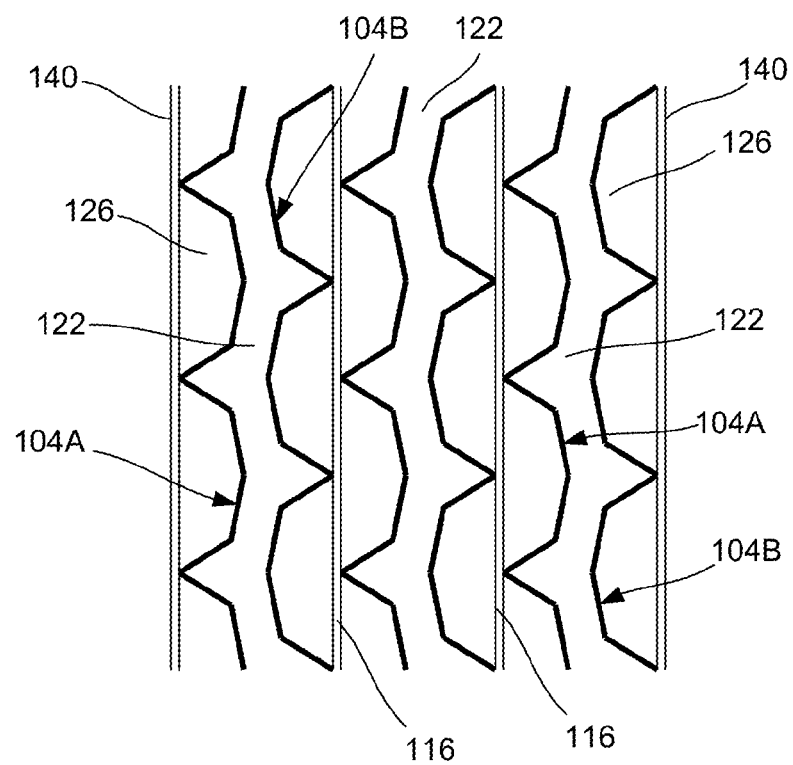
FIG. 20A depicts a fifth exemplary embodiment of a layered insulation system.

FIG. 20A depicts a fifth exemplary embodiment of the layered insulation system 102. In this fifth exemplary embodiment, the layered insulation system 102 can comprise three foam layers 122. In some embodiments, one or more of the foam layers 122 can have protrusions 124 that form a waffle pattern or parallel ridges, as discussed above. One or more of the foam layers 122 can be coated with a first coating layer 104A on one side and a second coating layer 104B on the opposing side. By way of a non-limiting example, in some embodiments one side of a foam layer 122 can be coated with a low infrared emittance coating, and the other side of the foam layer 122 can be coated with a low U value coating or film. In some embodiments, a low-E layer 116 such as a foil radiant barrier can be positioned between the foam layers 122 on the interior of the layered insulation system 102, and finishing layers 140 can be positioned on the exterior sides of the layered insulation system 102. The waffle-shaped or ridged pattern of the foam can leave gaps 126 between the majority of the foam layer 122 and the adjacent radiant barriers and/or external finishes.

Figure 20B:
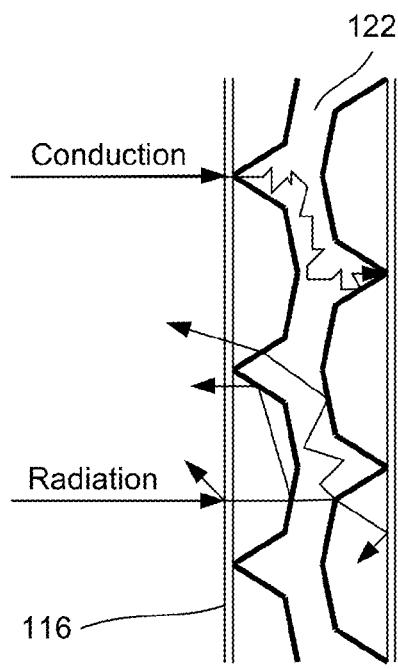
FIG. 20B depicts exemplary heat flow patterns within an embodiment of a foam layer.

FIG. 20B depicts an exemplary embodiment of one of the layers 104 shown in FIG. 20A. As can be seen from FIG. 20B, the foam layer 122 and coatings can inhibit heat transfer via convection by increasing the distance of a heat path through the layer 104. The layers 104 can also inhibit heat transfer via radiation, such as infrared radiation, by reflecting the radiation in different directions. The percentage of thermal energy that passes through each layer 104 can continue to be inhibited by subsequent layers 104, such as those shown in FIG. 20B.

Figure 21:
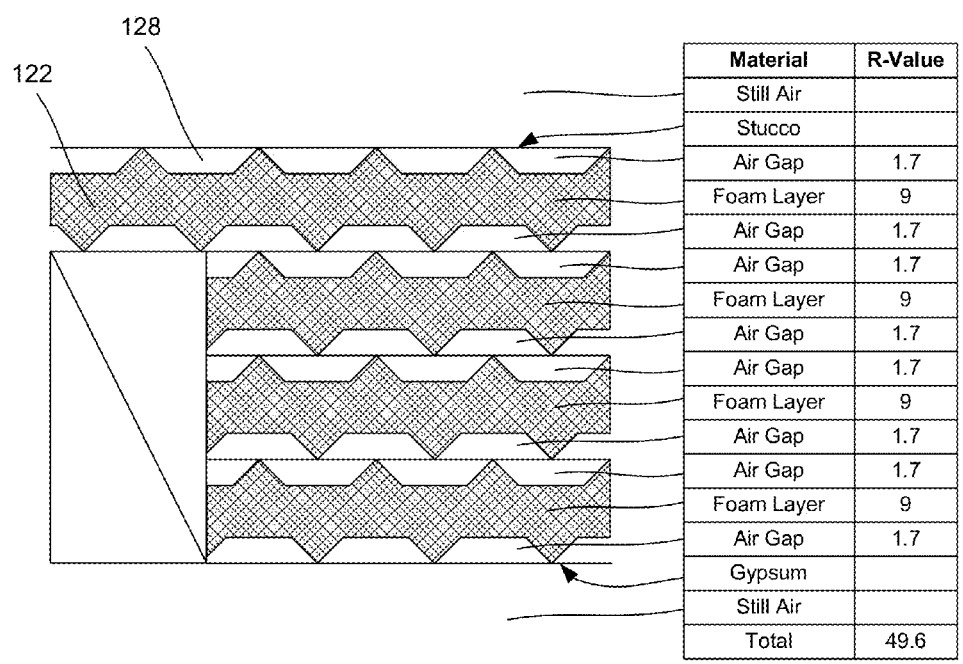
FIG. 21 depicts non-limiting examples of R-values of the layers of an exemplary embodiment of a layered insulation system.

FIG. 21 depicts a non-limiting example of performance values of an exemplary embodiment of the layered insulation system 102 comprising three layers 104 within the interior of a wall next to a structural member, such as a 2×4 stud, and an outer layer 104 at the exterior of the wall. In this exemplary embodiment, the three layers 104 shown next to the 2×4 stud can be placed within a 3.5 inch cavity within a wall, and the exterior layer 104 can be a 1 inch sheet coupled with the exterior of the wall. In this exemplary embodiment, the foam layers 122 can have an R-value of 9, and the gaps 126 can have an R-value of 1.7, however these values are non-limiting examples and other embodiments can have different R-values. As can be seen from FIG. 21, this exemplary embodiment of the layered insulation system 102 can have a total R-value of 49.6 within a total depth of 4.5 inches. In other embodiments, the foam layers 122 can have R-values greater than 9, while in still other embodiments, the R-value of a foam layer 122 can be less than 9.

While the R-value measurement describes the insulation's resistance to heat transfer via conduction, the layered insulation system 102 can also address heat transfer via radiation. In many situations, conduction can account for only 26% to 35% of total heat transfer, and insulation that does not account for the other 65% to 74% of heat transfer due to radiation can lead to extra energy being utilized to heat or cool a building due to the heat gained or lost due to radiation. Infrared radiation heats building components 106 such as walls and roof materials, which can distort the conventional determination of R-values or conductivity. Infrared radiation can also agitate the molecules of walls and roofs, which can cause additional heat conduction.

Figure 22:
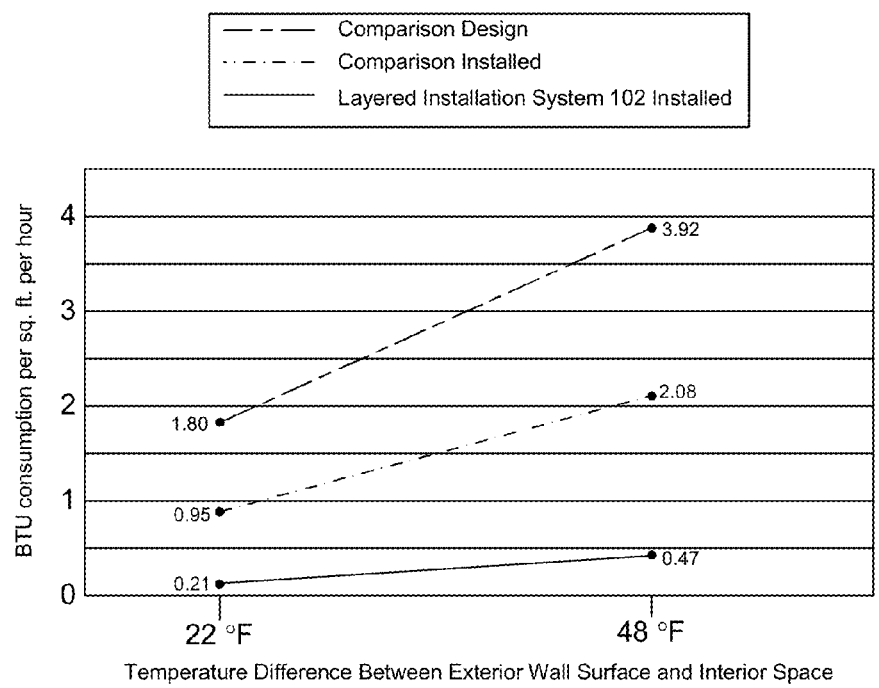
FIG. 22 depicts an exemplary chart of calculated values of energy required to maintain a temperature difference between the exterior and interior of a building using a comparison insulation system and an embodiment of the layered insulation system.

The layered insulation system 102 can address heat transfer due to conduction and radiation, which in some situations can lead to energy savings. FIG. 22 depicts a non-limiting example of a chart of calculations displaying the energy needed to maintain certain temperature differences between exterior wall surfaces and interior spaces using the theoretical designed performance of a comparison insulation system, the actual performance of the comparison insulation system, and the performance of an embodiment of the layered insulation system 102 similar to that of FIG. 21. The comparison insulation included, among other components, a fiberglass batting having a theoretical R-value of 19 and a sheet having a theoretical R-value of 3, with a total expected R-value of 23.1. However, because installation of fiberglass insulation routinely leads to actual resistance of heat transfer that is much less than the theoretical value, and because performance can be further degraded due to moisture, the actual performance of the comparison insulation has an R-value of only 12.2. Further, because the comparison insulation does not address the significant amount of heat transfer through convection, the actual amount of BTUs (British Thermal Units) per hour per square foot needed to cool a building to maintain a temperature of 72 degrees Fahrenheit within a building when the exterior environment is 120 degrees Fahrenheit is 3.92 using the comparison insulation system. In contrast, by using an embodiment of the layered insulation system 102 similar to that of FIG. 21 that addresses heat transfer through both conduction and radiation, the amount of energy needed to maintain the same temperature difference is only 0.47 BTUs. No thermal bridging is assumed in the calculations of FIG. 22.

Figure 23:
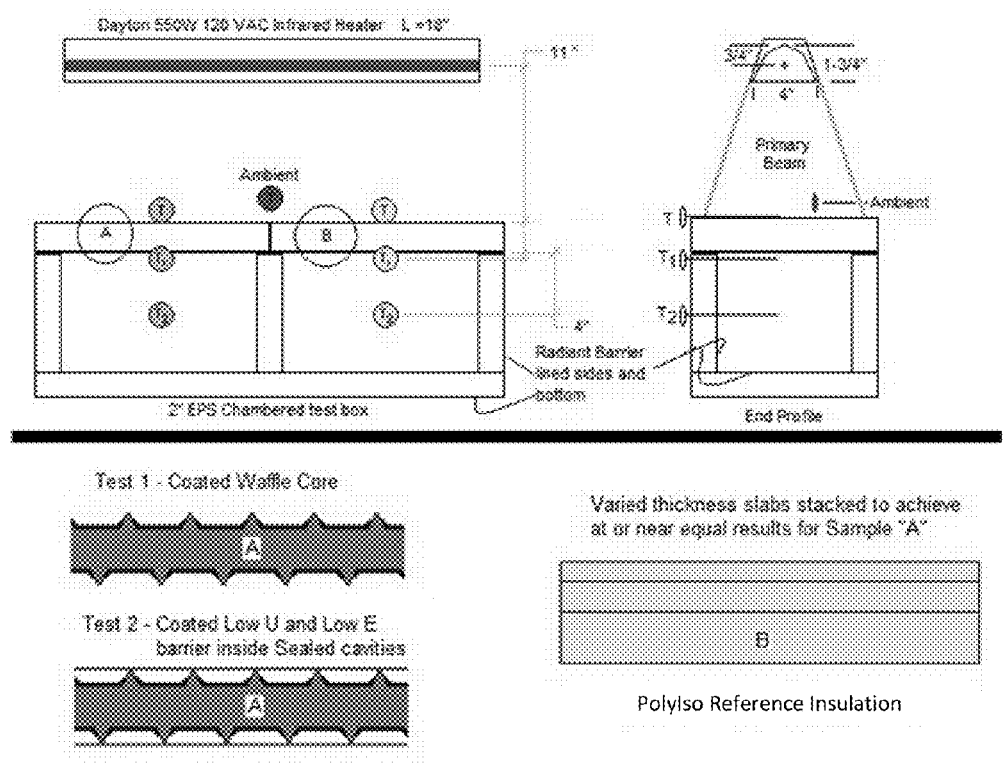
FIG. 23 depicts a testing environment for determining R-values.

FIG. 23 depicts the testing environment used to determine the R-values of non-limiting exemplary embodiments of the layered insulation system 102. The performance of embodiments of the layered insulation system 102 were compared to reference Polylso insulation samples aged approximately 3 months. Embodiments of the layered insulation system 102 remained stationary throughout testing, while thicknesses of reference insulation was added until performance of the layered insulation system 102 and reference insulation was substantially similar over 1, 2, and 3 hour periods. When performance was substantially similar, a data point using the advertised R-value of the reference sample could be established using a side by side comparison. Additionally, heat transfer rate of embodiments of the layered insulation system 102 was calculated using the equation "Q/("t A)=-k ("T/"x), where "Q is the amount of energy transferred in joules, "t is the change in time in seconds, A is the area in meters squared, "T is the temperature difference in Kelvins, "x is the thickness of the slab of insulation in meters, and k is its thermal conductivity in watts/(Kelvins*meters). The R-value of the slab was determined using 1/k after k was determined.

The 48% IR shade factor of a non-limiting exemplary embodiment of the layered insulation system 102 as illustrated in FIG. 22 was determined by placing an off-white visible light translucent film over sides A and B of the test setup shown in FIG. 23 to place both sides in the same state of color reflectance. The "T" A side value was compared to "T" B side and the difference was converted to a percentage. As discussed above, infrared radiation can have a significant impact on temperatures. By way of a non-limiting example, if an exterior sun-struck wall rises to 120 degrees Fahrenheit, and yet the exterior air temperature does not exceed 80 degrees Fahrenheit over the same period, then the 40 degree Fahrenheit rise over ambient temperature of the wall temperature can be predominantly attributable to infrared radiation. This temperature rise can translate to interior temperature gains depending on the emissivity of the insulation system. FIG. 24 depicts a table displaying generic load calculations for determinations of mechanical requirements of Btu=(U×delta T×SF area) with and without use of radiant barriers and low U coatings.

The layered insulation system 102 is not limited to the exemplary embodiments depicted in FIGS. 16-21. Any combination of layers 104 can be used in order to provide a layered insulation system 102 having the non-linear heat flow and/or other insulating or protective properties that are desired for a particular building or structure.

Although the invention has been described in conjunction with specific embodiments thereof, it is evident that many alternatives, modifications and variations will be apparent to those skilled in the art. Accordingly, the invention as described and hereinafter claimed is intended to embrace all such alternatives, modifications and variations that fall within the spirit and broad scope of the appended claims.

What is claimed is:

1. A layered insulation system, comprising:
   a foam layer comprising foam resistant to heat conduction, said foam layer having a plurality of protrusions extending from each surface of said foam layer, each protrusion having an apex region, wherein a combined apex region surface area is less than that of said foam layer;
   at least two reflective layers coupled with said foam layer, said at least two reflective layers
   being configured to reflect spectral and wide-band thermal radiation, and said at least two reflective layers being positioned to line at least a portion of substantially aligned substantially vertical channels on a first surface of said foam layer between said plurality of protrusions;
   said plurality of protrusions substantially aligned as a matrix grid having a plurality of sections on a second side of said foam layer; and
   at least one or more infrared transparent membranes coupled with said foam layer substantially at said apex regions and/or said at least one reflective layer to form one or more hermetically sealed gaps by sealing said spaces between said protrusions with said one or more infrared transparent membranes on said first side.

2. The layered insulation system of claim 1, wherein said at least one reflective layer follows the contours of the foam layer and its protrusions.

3. The layered insulation system of claim 1, wherein said at least one reflective layer comprises a plurality of substantially flat reflective layers positioned separately within said spaces.

4. The layered insulation system of claim 1, wherein said protrusions contact the surface of a substantially flat layer adjacent to said foam layer.

5. The layered insulation system of claim 1, wherein said protrusions are ridges arranged in a substantially grid-like pattern.

6. The layered insulation system of claim 1, wherein said protrusions are ridges arranged in lines, such that said spaces are channels bordered by said ridges.

7. The layered insulation system of claim 6, wherein said plurality of protrusions extend from a first side of said foam layer, and said ridges are substantially parallel on a second side of said foam layer.

8. The layered insulation system of claim 6, further comprising a transport system configured to selectively cause air in said channels to induce up through said channels.

9. The layered insulation system of claim 1, wherein a first surface of said foam layer is coated with a first low-U adhesive coating.

10. The layered insulation system of claim 9, wherein a second surface of said foam layer is coated with a second low-U adhesive coating.

11. The layered insulation system of claim 1, wherein a first surface of said foam layer is coated with a first film separated between said channels.

12. The layered insulation system of claim 5, wherein a second surface of said foam layer is coated with a second film series located within the base of each grid section.

13. The layered insulation system of claim 1, wherein said foam layer has a lattice structure.

14. The layered insulation system of claim 1, further comprising a moisture resistant coating coupled to said one or more infrared transparent membranes.

* * * * *